United States Patent
Iwaji et al.

(10) Patent No.: US 6,531,843 B2
(45) Date of Patent: Mar. 11, 2003

(54) DRIVING SYSTEM OF AC MOTOR

(75) Inventors: Yoshitaka Iwaji, Hitachi (JP);
Tsunehiro Endo, Hitachi-ohta (JP);
Hiroshi Fujii, Chiba (JP); Tatsuo Ando, Shimizu (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/941,791

(22) Filed: Aug. 30, 2001

(65) Prior Publication Data
US 2002/0060548 A1 May 23, 2002

(30) Foreign Application Priority Data

Aug. 30, 2000 (JP) ........................................ 2000-266004

(51) Int. Cl.[7] .............................................. H02P 1/24
(52) U.S. Cl. ...................... 318/727; 318/700; 318/722; 318/800; 318/801; 318/802; 318/803; 318/799; 318/254; 318/439; 363/15; 363/34; 363/35; 363/36; 363/37; 363/38; 363/39
(58) Field of Search ................................ 318/700, 727, 318/800, 801, 799, 722, 802, 803, 254, 432, 434, 439; 363/15, 34, 35, 36, 37, 38, 39

(56) References Cited

U.S. PATENT DOCUMENTS

| | | | | |
|---|---|---|---|---|
| 5,119,007 A | * | 6/1992 | Tunehiro et al. | 318/801 |
| 5,144,564 A | * | 9/1992 | Naidu et al. | 364/494 |
| 5,481,173 A | * | 1/1996 | Yamamoto | 318/801 |
| 5,801,509 A | * | 9/1998 | Sawa et al. | 318/705 |
| 5,821,713 A | | 10/1998 | Holling et al. | 318/439 |
| 5,903,128 A | | 5/1999 | Sakakibara et al. | 318/721 |
| 6,005,365 A | * | 12/1999 | Kaneko et al. | 318/700 |

(List continued on next page.)

FOREIGN PATENT DOCUMENTS

| | | | | |
|---|---|---|---|---|
| DE | 4413809 A1 | * | 11/1994 | H02P/7/44 |
| JP | 07-115799 | * | 5/1995 | H02P/21/00 |
| JP | 7245981 | | 9/1995 | |
| JP | 7177788 | | 3/1997 | |
| JP | 10-174456 | * | 6/1998 | H02M/7/48 |
| JP | 10257792 | | 9/1998 | |
| JP | 11069884 | | 3/1999 | |
| JP | 2000-217386 | | 4/2000 | |
| JP | 2002-078391 | * | 3/2002 | H02P/21/00 |

OTHER PUBLICATIONS

Excerpt from JIASC '99 with English Abstract, Proceedings of the 1999 Japan Industry Applications Society Conference, vol. 2, pp. 63–66.

*Primary Examiner*—Robert E. Nappi
*Assistant Examiner*—Tyrone Smith
(74) *Attorney, Agent, or Firm*—Antonelli, Terry, Stout & Kraus, LLP

(57) ABSTRACT

The present invention provides a control algorithm which instantaneously detects magnetic pole positions in the inside of a motor including polarities of the motor. A controller 1 applies a minute voltage change vhd to a voltage command on a dc axis which constitutes an estimation magnetic pole axis of the motor 3, detects electric currents Idc, Iqc of a motor 3 and discriminates the polarities of the magnetic pole axes by making use of the difference between a cycle in which ripple components of the electric currents Idc, Iqc become positive and a cycle in which the ripple components become negative or the difference between positive-side and negative-side current change rates. Further, the minute voltage change vhd with respect to the above-mentioned voltage command is generated on both of the dc axis and the qc axis rectangular thereto, and the magnetic pole positions of the motor are directly estimated based on the current ripple components on the respective axes. Without separately providing a cycle for discriminating the polarities of the magnetic poles, the cycle from the turning-on of a power source to the starting of the motor can be shortened so that the high-speed starting of the motor can be realized.

21 Claims, 17 Drawing Sheets

U.S. PATENT DOCUMENTS

| | | | |
|---|---|---|---|
| 6,188,196 B1 | 2/2001 | Koide et al. | 318/700 |
| 6,242,882 B1 * | 6/2001 | Kaneko et al. | 318/700 |
| 6,281,656 B1 * | 8/2001 | Masaki et al. | 318/700 |
| 6,344,725 B2 * | 2/2002 | Kaitani et al. | 318/700 |
| 6,396,229 B1 * | 5/2002 | Sakamoto et al. | 318/439 |
| 6,414,462 B2 * | 7/2002 | Chong | 318/701 |
| 2002/0021105 A1 * | 2/2002 | Na | 318/727 |
| 2002/0060547 A1 * | 5/2002 | Jung | 318/701 |

* cited by examiner

IN THE INSIDE OF MOTOR

CURRENT RIPPLE

IN THE INSIDE OF MOTOR

CURRENT RIPPLE

FIG.4
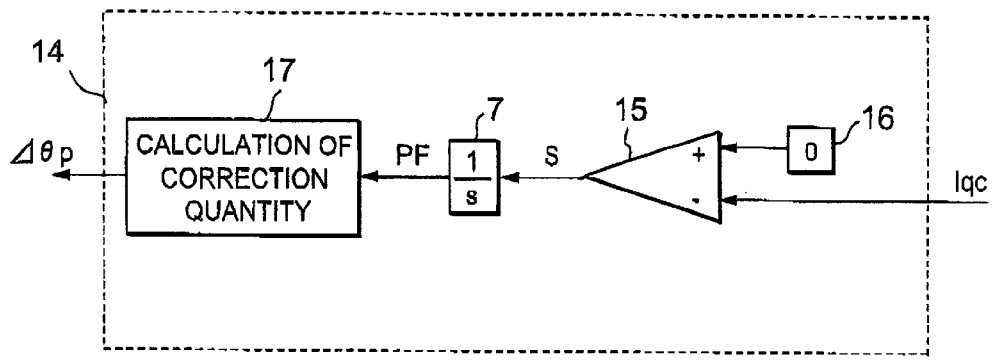
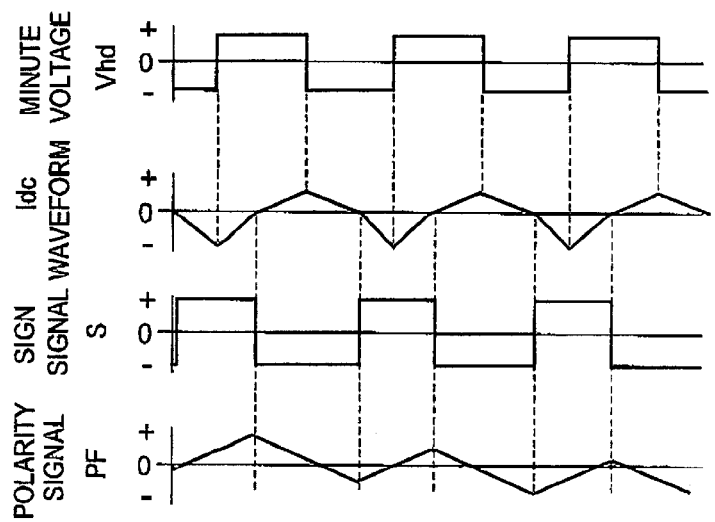
FIG.5A MINUTE VOLTAGE Vhd
FIG.5B Idc SIGNAL WAVEFORM
FIG.5C SIGN SIGNAL S
FIG.5D POLARITY SIGNAL PF
FIG.6
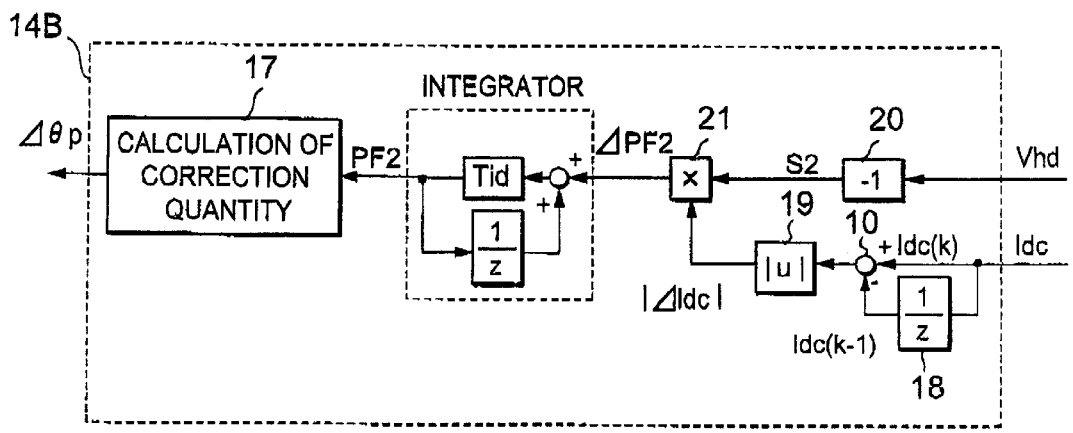

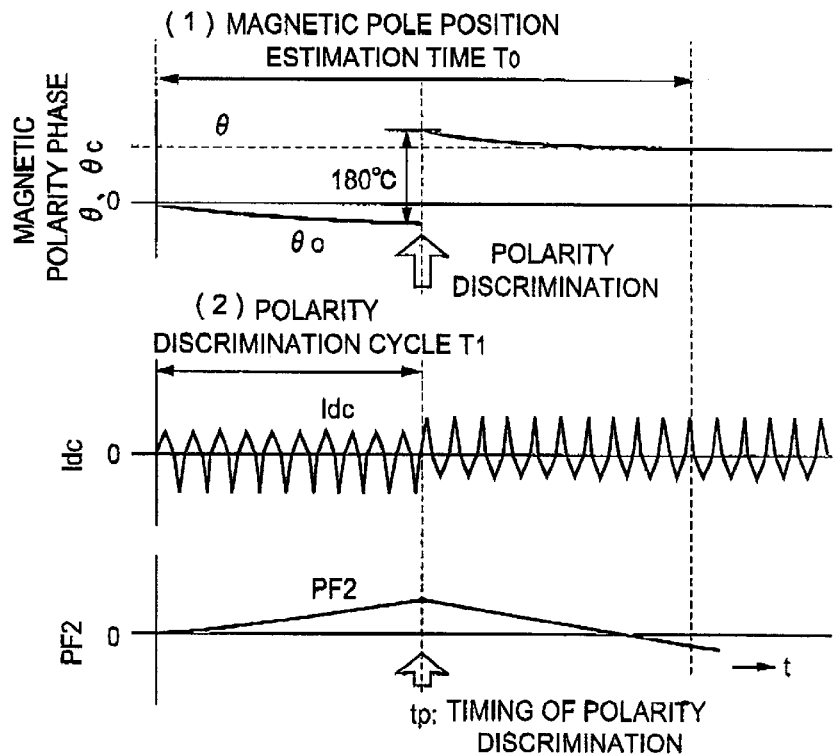
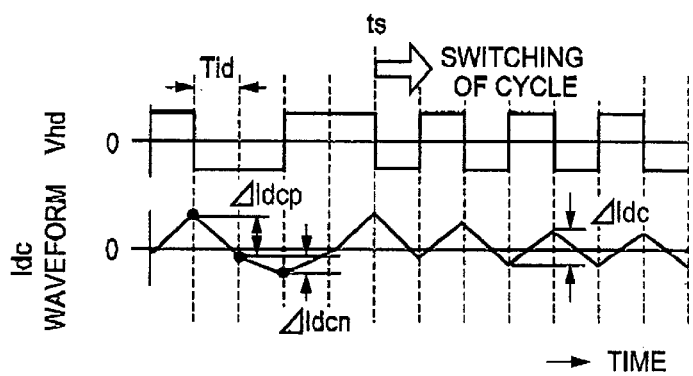
FIG. 11

| PFd | PFq | Δθ |
|---|---|---|
| + | + | 0 TO -90 DEGREES |
| + | - | 0 TO 90 DEGREES |
| - | + | -90 TO -180 DEGREES |
| - | - | 90 TO 180 DEGREES |

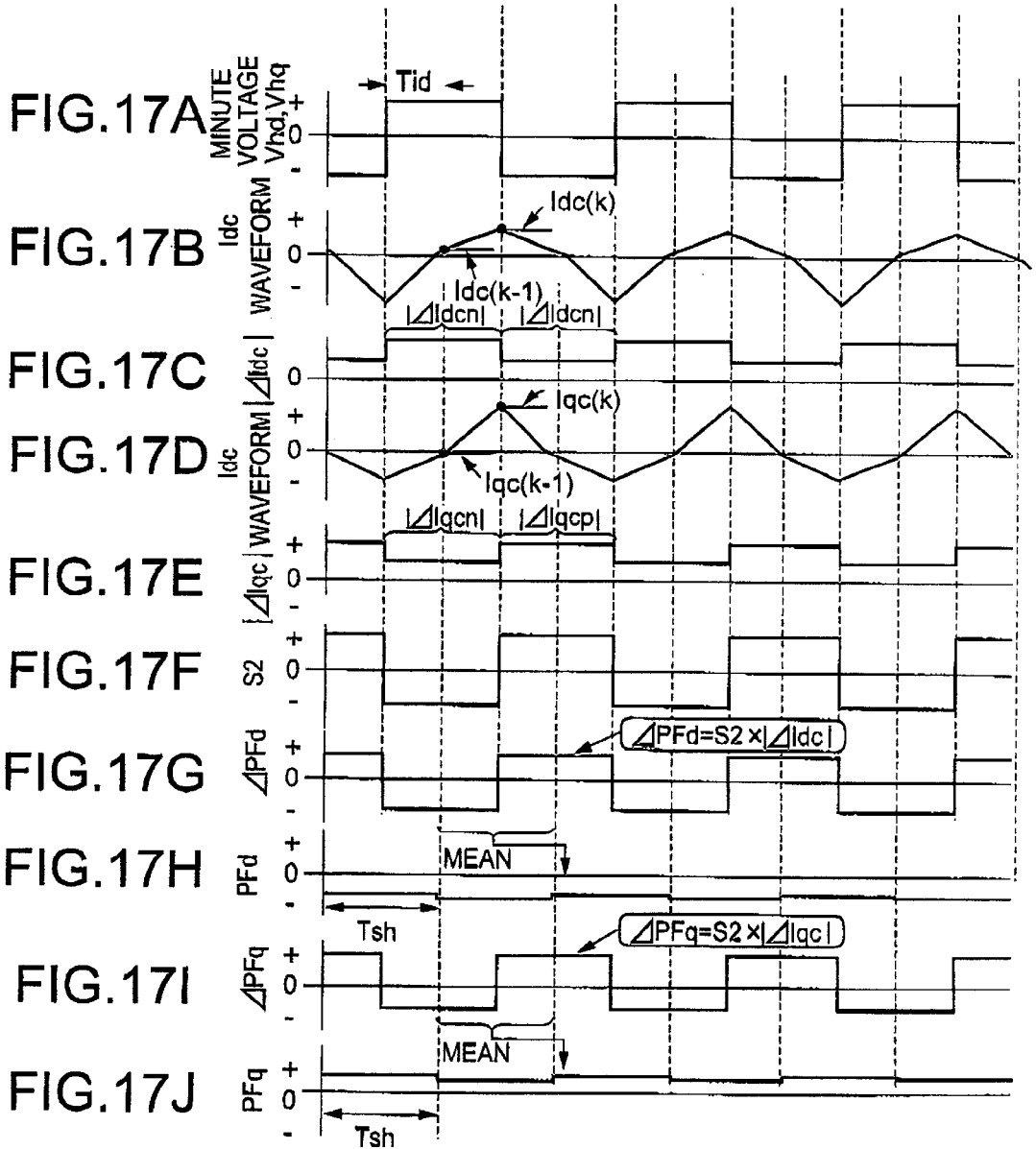

FIG.21A
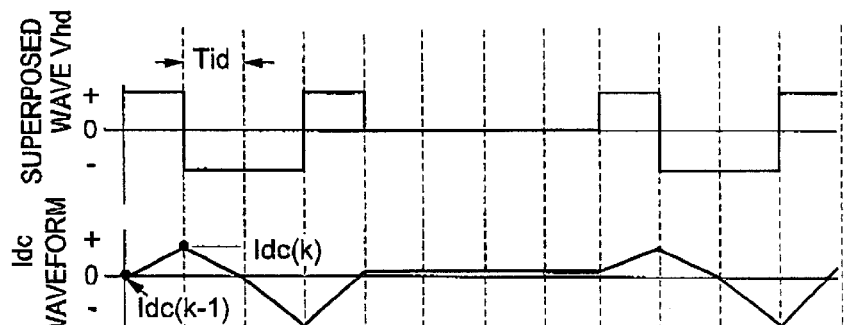
FIG.21B
FIG.21C
FIG.21D
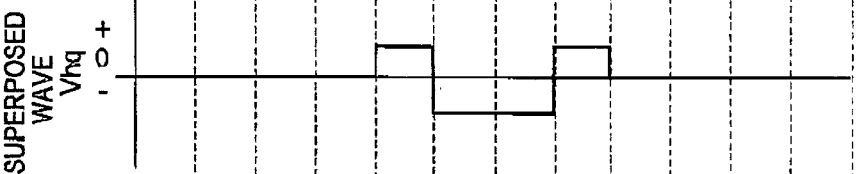
FIG.21E
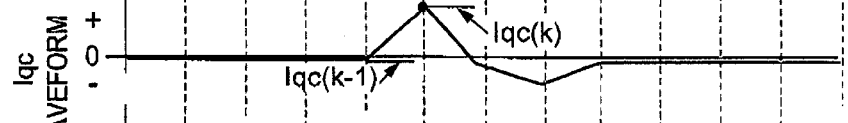
FIG.21F
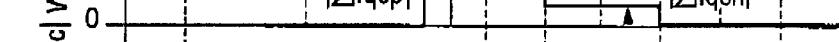
FIG.21G
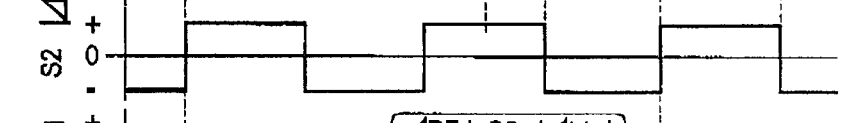
FIG.21H
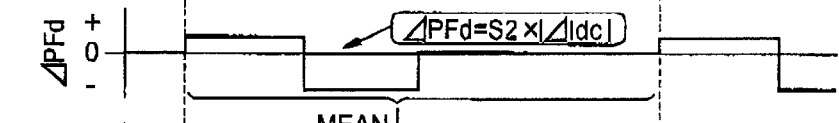
FIG.21I
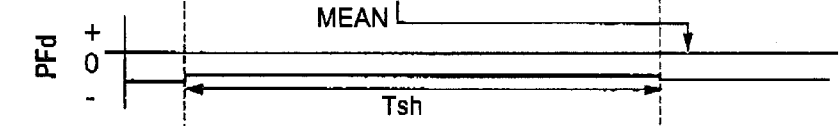
FIG.21J
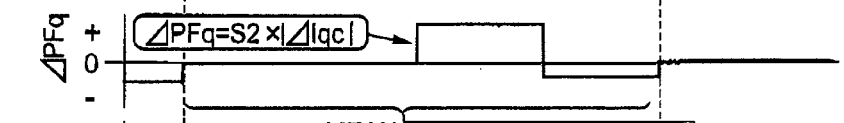
FIG.21K
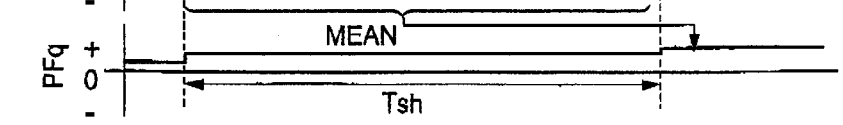

DRIVING SYSTEM OF AC MOTOR

BACKGROUND OF THE INVENTION

The present invention relates to a driving system of an AC motor, and more particularly to a system which can realize a high-performance motor control without using a sensor which detects an electrical angle position of an AC motor.

As methods for controlling a synchronous motor without detecting an electrical angle position, methods which are described in Japanese Patent Laid-Open No. 245981/1995 (referred to as "literature 1" hereinafter), Japanese Patent Laid-Open No. 177788/1995 (referred to as "literature 2"hereinafter), "Method for estimating positions of magnetic poles of a PM motor which focuses on a magnetically non-linear electric current distortion", Japan Electric Society, Industrial Application Section, Nationwide Convention, No.191, 1999 (referred to as "literature 3" hereinafter) and the like have been known. Methods described in all these literatures relate to the method for estimating magnetic poles in the inside of a synchronous motor.

The technique described in the literature 1 performs the estimation of positions of magnetic poles by making use of the electrically salient characteristics of a permanent magnet type synchronous motor (PM motor). In this technique, an alternating magnetic field is generated on an estimated magnetic pole axis (dc axis) of the PM motor, an AC current (or an AC voltage) having a component in an axis which intersects the estimated magnetic pole axis (qc axis) is detected, and the positions of magnetic poles in the inside of the motor are calculated by estimation based on the detected AC current. When there is an error between the actual magnetic pole axis and the estimated magnetic flux axis, the feature that the interference term of the inductance is present between the dc axis and the qc axis is used. However, to extract the AC current (voltage) component, the Fourier series (the Fourier expansion) or a band pass filter is used.

The technique described in the literature 2 performs the estimation calculation of the positions of the magnetic poles using the electrically salient characteristics and the magnetic saturation characteristics of the PM motor. The estimation algorithm is divided in two steps consisting of a step 1 and a step 2, wherein the estimation of the positions of the magnetic poles is performed using the electrically salient characteristics of the PM motor in the step 1 and the change of inductance due to the magnetic saturation is measured and the polarities of the magnetic poles are discriminated in the step 2.

The technique described in the literature 3 calculates the positions of the magnetic poles by estimation using the magnetic saturation characteristics of the PM motor. In this technique, a sinusoidal voltage having high frequency is applied to the PM motor and the current waveform generated according to such an application of voltage is subjected to a frequency analysis thus calculating the polarities of the magnetic poles and the positions of the magnetic poles by estimation based on the phase of the secondary higher harmonic components.

The technique described in the above-mentioned literature 1 uses the principle that the inductance of the PM motor is changed in accordance with the function of 2θ for the phase θ of the electrical angle. When the estimation of the positions of the magnetic poles is performed based on this principle, there may be a case that an error of 180° is present with respect to the result of the estimation. If this state is maintained as it is, there is a possibility that the PM motor becomes uncontrollable at the time of starting the PM motor. Accordingly, it becomes necessary to provide means which discriminates the polarity of the magnetic pole axis (d axis) separately.

Further, the technique described in the literature 2, in the step 1, as in the case of the literature 1, performs the estimation of the positions of the magnetic poles by using the change of inductance to the electrical angle as in the case of the literature 1 in the step 1. In the step 2, a voltage step is generated on the PM motor and the polarity discrimination of the magnetic poles is performed based on a current response time at this point of time. The step 2 makes use of a phenomenon that the magnetic saturation is generated or decreased in response to the relationship between the magnetic flux generated by the permanent magnet and the magnetic flux component generated by the voltage step and eventually the inductance (electrical time constant) is changed. With the use of this technique, the discrimination of the polarities of the magnetic poles is possible and hence, it is possible to surely start the PM motor. However, this technique has a drawback that the estimation algorithm is divided in two stages (step 1, step 2) and hence, it takes some time to start the PM motor. Accordingly, it is difficult to apply such a technique to an application where a rapid acceleration is to be performed from a point of time that a power supply is turned on and the control algorithm also becomes complicated.

The technique described in the literature 3 estimates the polarities of the magnetic poles and the positions of the magnetic poles by applying the high frequency (approximately 500 Hz) to the PM motor and by extracting the distorted current components which are generated due to such an application of high frequency. Since the technique uses the phenomenon that the distortion of the waveform is derived from the magnetic saturation, the estimation of the positions of the magnetic poles can be performed without performing the discrimination of the polarities of the magnetic poles. However, it is necessary to accurately extract the high-frequency distortion components and hence, the fine sampling of the electric-current waveforms becomes necessary. Further, the technique requires the complicate processing such as the Fourier series or the Fourier expansion. To increase the accuracy of the Fourier series or the Fourier expansion, the detection of current for a reasonably long time is necessary and it takes some time to start the PS motor.

SUMMARY OF THE INVENTION

The present invention has been made in view of the above-mentioned drawbacks of the prior art and it is an object of the present invention to provide a driving system of an AC motor which is applicable to an electrically non-salient motor and can perform the determination of polarities and the detection of the position of magnetic poles with a simple algorithm.

The gist of the present invention which is provided for achieving the above-mentioned object lies in that, in the inside of a controller which controls a motor, the discrimination of polarities of magnetic poles and the detection of the positions of magnetic poles are performed or the detection of the positions of the magnetic poles are performed including the discrimination of magnetic poles and a vector control is performed.

The discrimination of the polarities is performed such that a minute voltage change is given to a dc axis which is an estimation axis of a magnetic flux in the inside of the motor, with respect to ripple components contained in observed values of a current which flows in the motor, current flow times at a positive side and a negative side of the ripple components are measured, and the polarities of magnetic poles in the inside of the motor are discriminated based on these values. Alternatively, the current change rates at the positive side and the negative side of the ripple components are measured and the polarities of magnetic poles are discriminated based on these values.

Here, the detection of the positions of the magnetic poles is performed such that in parallel with the above-mentioned discrimination of polarities of the magnetic poles, the electric current which flows in the motor is observed in a qc axis which is perpendicular to the dc axis and the estimation of the positions of the polarities in the inside of the motor is performed using the change-rate components of the observed current.

Another detection of the positions of the magnetic poles according to the present invention is performed such that a minute voltage change is given to voltage commands on the dc axis which is the estimation magnetic flux axis of the motor and to voltage commands on the qc axis which is perpendicular to the dc axis, the current which flows in the motor is observed on the dc axis and the qc axis, with respect to ripple components contained in the current values observed on the dc axis and the qc axis, the positions of the magnetic poles in the inside of the motor are estimated based on the current flow times at the positive side and the negative side of the ripple components. Alternatively, the current change rates of the ripple components are detected such that they are separately detected at the positive side and the negative side of the ripple components and, thereafter, the positions of the magnetic poles in the inside of the motor are estimated based on these change-rate values.

The estimation of the positions of the magnetic poles and the discrimination of the polarities may be performed in parallel and, upon the completion of the discrimination of the polarities, the cycle of the minute voltage change given to the voltage commands may be changed and thereafter the estimation of the positions of the magnetic poles may be performed in a succeeding manner.

Further, with respect to respective change rates of the current ripple components on the dc axis and the qc axis, that is, the change rate $\Delta Idcp$ (the current change rate at the positive side of the ripple components of the dc-axis current), the change rate $\Delta Idcn$ (the current change rate at the negative side of the ripple components of the dc-axis current), the change rate $\Delta Iqcp$ (the current change rate at the positive side of the ripple components of the qc-axis current), the change rate $\Delta Iqcn$ (the current change rate at the negative side of the ripple components of the qc-axis current), an axial error $\Delta\theta(=\theta c-\theta)$ which is the difference between a phase $\theta c$ of an electrical angle at the dc axis and the qc axis and a phase $\theta$ of an magnetic pole axis in the inside of the motor is calculated based on an equation (10) explained later.

Alternatively, the positions of the magnetic poles are estimated based on the change of the inductance. That is, with respect to the current change rates at the separate positive and negative sides of the ripple components on the dc axis and the qc axis, the inverse numbers of the current change rates of respective axes and respective signs are calculated and the positions of the magnetic poles (the positions of the magnetic poles including polarites) in the inside of the motor are estimated based on these values. The inverse numbers of the current flow rates are proportional to the inductance.

Here, the inverse numbers of the positive and negative current change rates are Lmdcp $(=1/|\Delta Idcp|)$, Lmdcn $(=1/|\Delta Idcn|)$, Lmqcp $(=1/|\Delta Iqcp|)$ and Lmqcn $(=1/|\Delta Iqcn|)$ and the above-mentioned axial error $\Delta\theta(=\theta c-\theta)$ which is the difference between the phase $\theta c$ of the electrical angle at the dc axis and the qc axis and the phase $\theta$ of the magnetic pole axis of the motor is calculated based on an equation (13) explained later.

According to the AC motor driving system of the present invention which has been explained above, it is possible to obtain an advantageous effect that by applying the minute voltage changes to the motor, the polarities of the magnetic poles in the inside of the motor can be easily discriminated based on the current flow times or the current change rates at the positive side and the negative side of the current ripple components which are generated by the application of the minute voltage changes.

Further, the detection of the positions of the magnetic poles can be performed using the known method or the method of the present invention in parallel with the discrimination of the polarities and hence, an advantageous effect that the time necessary for starting the motor can be shortened. By changing the cycle of the minute voltage change upon the completion of the discrimination of the polarities, the higher harmonics in current which are generated along with the estimation of the positions of the magnetic poles can be suppressed.

According to the AC motor driving system of the present invention, the minute voltage changes are given to the voltage commands on the dc axis and on the qc axis which is perpendicular to the dc axis and the positions of the magnetic poles are estimated based on the current flow times at the positive side and the negative side of the respective ripple current components. In this manner, the change of the ripple components due to the saturation of the motor is used and hence, the estimation of the positions of the magnetic poles including the polarities of the magnetic poles can be realized.

Alternatively, by performing the calculation with the use of the arc tangent function as a function relating to the current change rates of the ripple components, the axial error $\Delta\theta$ between the control axis and the magnetic pole axis of the motor can be directly calculated and hence, the detection of the positions of the magnetic poles can be realized with a simple algorithm.

Further, with respect to the separate positive and negative current change rates of the current ripple components, the inverse numbers of these values are calculated and hence, the positions of the magnetic poles can be estimated based on the change of the inductance of the motor so that the estimation of the positions of the magnetic poles can be realized with high accuracy.

BRIEF DESCRIPTION OF THE DRAWINGS

FIG. 4 is a constitutional view of a polarity descrimination according to the first embodiment.

FIG. 5A is a graph showing a waveform of a minute voltage change component vhd according to the first embodiment.

FIG. 5B is a graph showing a waveform of the current detection value Idc according to the first embodiment.

FIG. 5C is a graph showing a waveform of a sign signal S according to the first embodiment.

FIG. 5D is a graph showing a waveform of polarity signal PF according to the first embodiment.

FIG. 6 is a constitutional view of a polarity discriminator according to a second embodiment of the present invention.

FIG. 10A is a graph showing the change of magnetic pole phases θ, θc as time elapses according to the third embodiment.

FIG. 10B is a graph showing the change of a current detection value Idc as time elapses according to the third embodiment.

FIG. 10C is a graph showing the change of a polarity signal PF2 as time elapses according to the third embodiment of the present invention.

FIG. 11 is a graph showing the change of a current detection value Idc which is made in response to the changeover of the cycle of a minute voltage change component vhd according to a fourth embodiment.

FIG. 17A is a graph showing a waveform of a minute voltage change component vhd according to the sixth embodiment.

FIG. 17B is a graph showing a waveform of a current detection value Idc according to the sixth embodiment.

FIG. 17C is a graph showing a waveform of an absolute value |ΔIdc| of a current change rate according to the sixth embodiment.

FIG. 17D is a graph showing a waveform of a current detection value Iqc according to the sixth embodiment.

FIG. 17E is a graph showing a waveform of an absolute value |ΔIqc| of a current change rate according to the sixth embodiment.

FIG. 17F is a graph showing a waveform of a sign signal S2 according to the sixth embodiment.

FIG. 17G is a graph showing a waveform of a multiplication result ΔPFd of the absolute value |ΔIdc| of the current change rate and the sign signal S2 according to the sixth embodiment.

FIG. 17H is a graph showing a waveform of an output PFd from a mean value calculation unit according to the sixth embodiment.

FIG. 17I is a graph showing a waveform of a multiplication result ΔPFq of the absolute value |ΔIqc| of the current change rate and the sign signal S2 according to the sixth embodiment.

FIG. 17J is a graph showing a waveform of an output PFq from a mean value calculation unit according to the sixth embodiment.

FIG. 21A is a graph showing a waveform of a minute voltage change component (superposed wave) vhd according to the seventh embodiment.

FIG. 21B is a graph showing a waveform of a current detection value Idc according to the seventh embodiment.

FIG. 21C is a graph showing a waveform of an absolute value |ΔIdc| of a current change rate according to the seventh embodiment.

FIG. 21D is a graph showing a waveform of a minute voltage change component (superposed wave) vhq according to the seventh embodiment.

FIG. 21E is a graph showing a waveform of a current detection value Iqc according to the seventh embodiment.

FIG. 21F is a graph showing a waveform of an absolute value |ΔIqc| of a current change rate according to the seventh embodiment.

FIG. 21G is a graph showing a waveform of a sign signal S2 according to the seventh embodiment.

FIG. 21H is a graph showing a waveform of a multiplication result ΔPFd of the absolute value |ΔIdc| of the current change rate and the sign signal S2 according to the seventh embodiment.

FIG. 21I is a graph showing a waveform of an output PFd from a mean value calculation unit according to the seventh embodiment.

FIG. 21J is a graph showing a waveform of a multiplication result ΔPFq of the absolute value |ΔIqc| of the current change rate and the sign signal S2 according to the seventh embodiment.

FIG. 21K is a graph showing a waveform of an output PFq from a mean value calculation unit according to the seventh embodiment.

DESCRIPTION OF THE PREFERRED EMBODIMENTS

Figure 1:
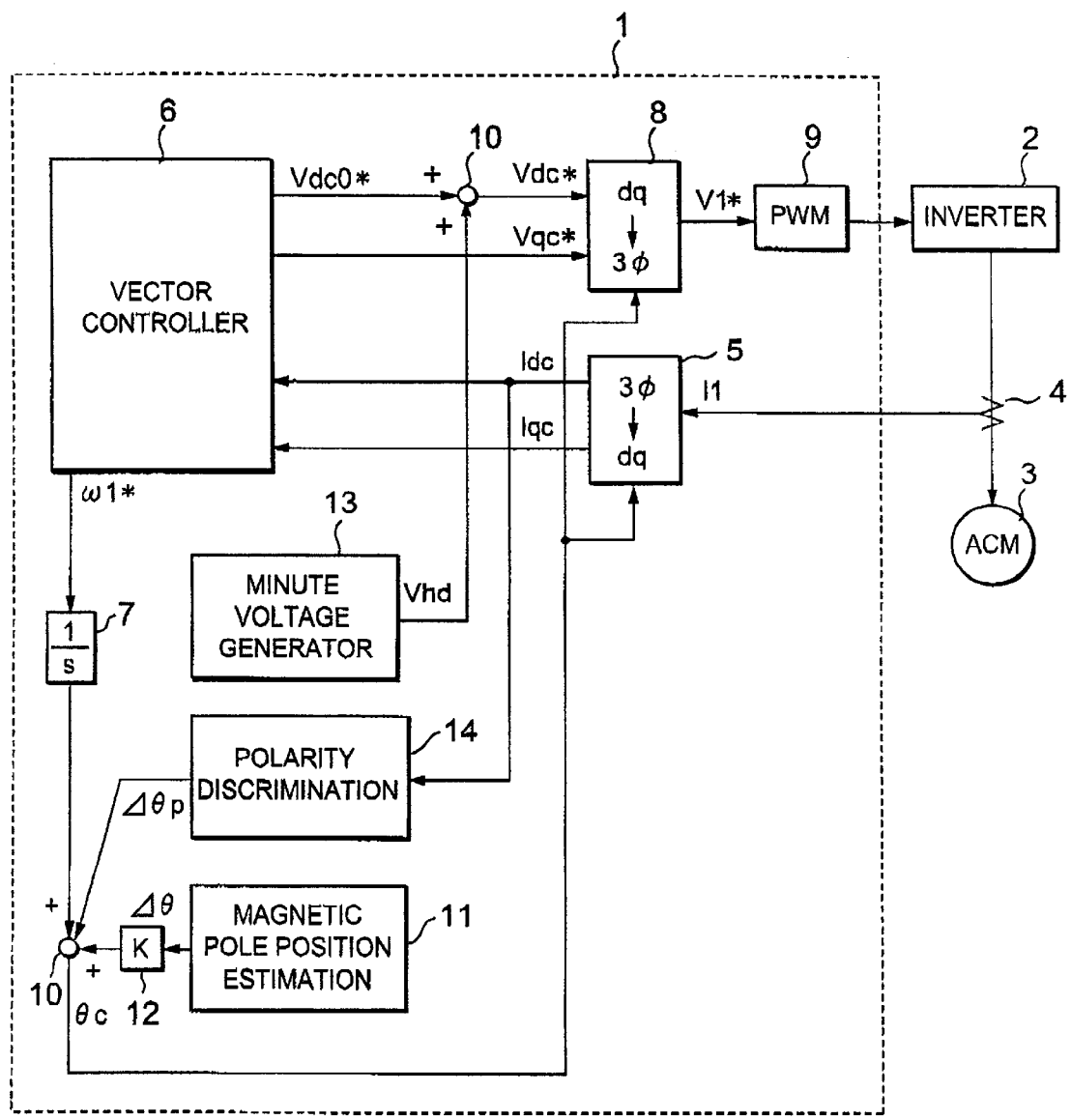
FIG. 1 is a constitutional view of a system according to a first embodiment of the present invention.

FIG. 1 shows a constitution of a system according to a first embodiment of the present invention. This system includes a controller 1 which controls an AC motor 3, an inverter 2 which drives the motor 3 in accordance with instructions from the controller 1, and the AC motor 3. The controller 1 includes means which estimates a dc axis of a magnetic flux in the inside of the motor 3 and gives a minute voltage change to the dc axis and means to observe a current which flows in the motor 3. With respect to ripple components contained in the observed values of the current, the controller 1 measures the current flow time at the positive side and the negative side of the ripple components and discriminates the polarities of magnetic poles in the inside of the motor 3 based on these measured values.

To be more specific, the controller 1 includes a current detector 4 which detects the current in the motor 3, a dq converter 5 which performs a coordinate conversion of the current detection value obtained by the current detector 4 into rotary coordinate dcqc axes which are set in the inside of the controller 1 as explained later, a vector controller 6 which outputs voltage commands Vdc0*, Vqc0* for controlling the speed or the torque of the motor 3, an integrator 7 which obtains an electrical angle position (phase) θc by integrating an electrical angle frequency ω1 of the motor 3, a dq inverse converter 8 which performs the coordinate conversion of voltage commands Vdc*, Vqc* on the dc, qc axes into voltage commands of a three-phase alternating current, a PWM generator 9 which generates pulses for controlling the inverter 2 based on the three-phase voltage commands, an adder 10 which adds signals, a magnetic pole position estimator 11 which calculates an error Δθ between the magnetic pole position of the motor 3 and estimated magnetic pole position, a correction unit 12 which corrects the electrical angle position θc in the inside of the vector controller 6 based on the axial error Δθ, a minute voltage generator 13 which gives a minute voltage change component vhd to the voltage command Vdc0*, and a polarity discriminator 14 of magnetic poles which constitutes a characterizing potion of the present invention.

Subsequently, the operation principle of this embodiment is explained. In the vector controller 6, the control calculation for controlling the.velocity or the torque of the motor 3 is performed. With the use of the coordinate converter 5, the three-phase AC current which is detected by the current detector 4 is converted into values Idc, Iqc on the dc, qc axes of the rotational coordinates set in the inside of the vector controller 6. Assuming a component in the direction along which the magnetic pole of the motor 3 is present as Idc and a component which is perpendicular to the component Idc as Iqc, the vector controller 6 calculates the values of voltages Vdc0*, Vqc0* applied to the motor 3 such that the components Idc, Iqc respectively take given values and these voltages Vdc0*, Vqc0* are outputted. These voltage commands Vdc0*, Vqc0* are again converted into the three-phase AC quantity and they are converted into pulse signals for performing the switching operation of the inverter 2 at the PWM generator 9. The inverter 2 is driven in response to signals from the PWM generator 9 and applies voltages corresponding to the voltage commands calculated by the controller 1 to the motor 3.

When the phases positions θ of the magnetic poles of the motor 3 can be directly detected by a magnetic pole position detector, the three-phase detected current can be subjected to the coordinate conversion based on these detected phases and hence, the excited current component Idc (parallel current component) and the torque current component can be obtained. The vector controller 6 independently controls these two current components. That is, the vector controller 6 obtains torque current commands and excited current commands to set the speed and the torque of the motor 3 to desired values and changes the values of the voltage commands Vdc0*, Vqc0* such that the torque current command and the excited current command agree with the detected values Idc, Iqc. Here, with respect to the vector control, the detailed explanation of the control is described in a literature "Theory of AC serve system and actual designs thereof", written by Hidehiko Sugimoto, Sogo Denshi Shuppan or the like.

As mentioned above, it is necessary to detect the position of magnetic poles in the inside of the motor to perform the vector control. In the motor driving system according to the present invention, the positions of magnetic poles in the inside of the motor are detected without using a magnetic pole position detector (sensor).

Subsequently, the polarity discrimination which constitutes the characterizing portion of this embodiment is explained. Here, it is assumed that the magnetic pole position estimation according to this embodiment can be performed using the technique described in the literature 1, for example.

According to the technique described in the previously mentioned literature 1, the alternating magnetic field is generated on the estimated magnetic pole axis (dc axis) of the PM motor and the alternating current (or alternating voltage) on the axis (qc axis) which is perpendicular to the estimated magnetic pole axis is detected, and the positions of the magnetic poles in the inside of the motor is calculated based on the detected values by estimation. When there exists an error between the actual magnetic pole axis and the estimated magnetic pole axis, making use of the feature that the interference term of the inductance exists between the dc axis and qc axis, the axis at the control side is corrected such that the alternating current generated on the qc axis becomes 0 so as to make the dc axis aligned with the magnetic pole axis. In the magnetic pole position estimator 11, the above-mentioned magnetic pole position estimation algorithm is executed so that the axial error $\Delta\theta$ is substantially converged to 0 degree or 180 degrees. That is, as the dc axis and the qc axis of the rotational coordinate, at the beginning, those which are subjected to initializing are used and thereafter the magnetic position estimator 11 executes the above-mentioned magnetic pole position estimation algorithm such that the dc axis and the qc axis which exhibit a less error between the dc ax axis and the qc axis and the actual magnetic pole axis are used sequentially.

As mentioned previously, the magnetic pole position estimation algorithm according to the literature 1 makes use of the difference of inductance derived from the electrically salient characteristics of the motor, wherein the inductance is changed with a function of $2\theta$ for an electrical angle $\theta$. Accordingly, the converging points of the magnetic pole positions exist at two positions (0 degree and 180 degrees) and hence, the discrimination of the polarities of the magnetic poles becomes inevitable.

Then, the operations of respective blocks relevant to the polarity discrimination are explained. The minute voltage change component vhd is generated in the minute voltage generator 13 and this component vhd is added to the dc-axis voltage command Vdc0*. As the minute voltage change component vhd, the square wave having high frequency or the like is used. Due to this addition of the minute voltage change component vhd, a current ripple is generated in the current on the dc axis. The polarities of the magnetic poles are estimated based on these current ripple components.

Figure 2A:
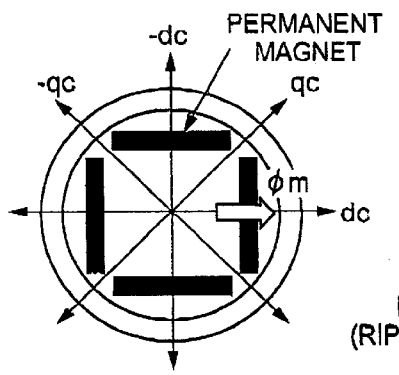
FIG. 2A is a view showing the magnetic flux direction and the control axis (dc axis, qc axis) direction of a permanent magnet of a motor when a magnetic pole axis is correctly estimated.
Figure 2B:
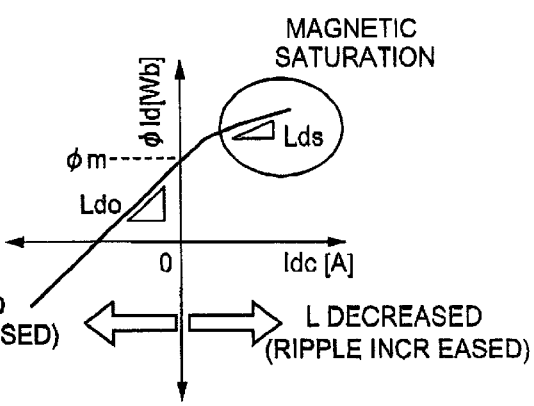
FIG. 2B is a graph showing the relationship between a torque current detection value Idc and a primary magnetic flux $\Phi_{fd}$ when the magnetic pole axis is correctly estimated.
Figure 2C:
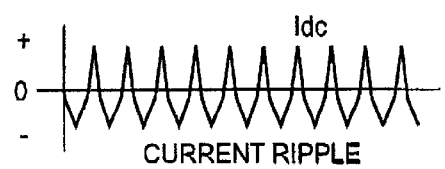
FIG. 2C is a graph showing a current ripple waveform when the magnetic pole axis is correctly estimated.
Figure 3A:
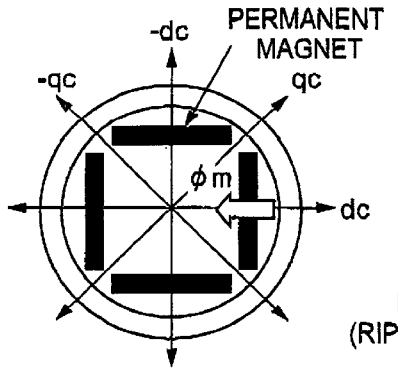
FIG. 3A is a view showing the magnetic flux direction and the control axes (dc axis, qc axis) direction of a permanent magnet of a motor when a magnetic pole axis is estimated with the displacement of 180 degrees.
Figure 3B:
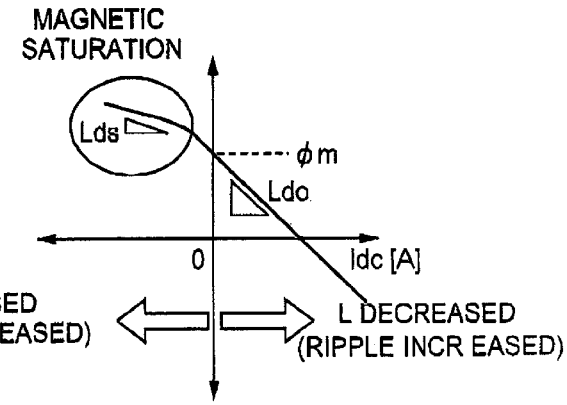
FIG. 3B is a graph showing the relationship between a torque current detection value Idc and a primary magnetic flux $\Phi_{Id}$ when the magnetic pole axis is estimated with a displacement of 180 degrees.

Subsequently the operation principle of the polarity discrimination of this embodiment is explained. FIG. 2 shows a case in which the dc axis is aligned with the polarity of the magnetic pole and FIG. 3 shows a case in which the dc axis and the polarity of the magnetic pole are inverted from each other. With respect to FIG. 2 and FIG. 3, the direction of the magnetic flux of the permanent magnet and the direction of the control axes (dc, qc axes) in the inside of the motor are indicated in FIG. 2A and FIG. 3A, the relationship between the current detection value Idc and the primary magnetic flux $\Phi_{Id}$ is indicated in FIG. 2B and FIG. 3B, and the current ripple waveform is indicated in FIG. 2C and FIG. 3C.

In the case of FIG. 2, when the current is made to flow in the positive direction along the dc axis, the magnetic flux is increased with respect to the magnetic flux of the permanent magnet in the inside of the motor 3. Accordingly, the total primary magnetic flux $\Phi$Id is increased and the magnetic saturation is generated. As a result, the inductance is lowered and the current change rate is increased. To the contrary, when the current is made to flow in the negative direction along the dc axis, the magnetic flux is decreased with respect to the magnetic flux of the permanent magnet. Accordingly, the magnetic saturation is not generated and the inductance is not changed and hence, the current change rate is decreased compared with the case in which the current is made to flow in the positive direction. Accordingly, with respect to the current ripple waveform, the change rate becomes large when the current detection value Idc takes the positive value and becomes the moderate when the current detection value Idc takes the negative value.

Figure 3C:
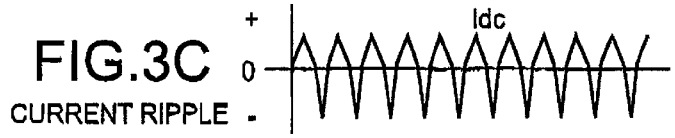
FIG. 3C is a graph showing a current ripple waveform when the magnetic pole axis is estimated with a displacement of 180 degrees.

FIG. 3 shows a phenomenon which is opposite to the phenomenon shown in FIG. 2. As shown in FIG. 3C, when the current takes the negative value, the current change rate is increased and when the current takes the positive value, the current change rate becomes moderate. By extracting the characteristic quantity of the current ripple waveform, the discrimination of the polarities of magnetic poles becomes possible.

The constitution of the polarity discrimination 14 is explained in conjunction with FIG. 4. A comparator 15 has a + input terminal and a − input terminal. The comparator 15 compares the magnitudes of inputs to these two input terminals and outputs "1" when the "+" input is larger than the "−" input and outputs "−1" in the opposite case. A zero signal generator. 16 outputs "0" to the +input terminal of the comparator 15. The integrator 7 integrates outputs from the comparator 15 and obtains a performance index PF. A correction quantity calculator 17 outputs a phase offset $\Delta\theta p$ in response to the value of the performance index PF.

The operation of the polarity discrimination 14 is explained in conjunction with FIG. 5. FIG. 5A indicates the waveform of the minute voltage change component vhd added to the dc axis. Due to this application of the minute voltage change component vhd, the current detection value Idc takes the waveform shown in FIG. 5B. Then, the current detection value Idc is compared with "0" at the comparator 15 and the output of the comparator becomes S=−1 when the current detection value Idc is positive and S=1 when the current detection value Idc is negative. Since the current detection value Idc contains the distortion of waveform due to the magnetic saturation, the time that the current detection value Idc takes the positive value is different from the time that the current detection value Idc takes the negative value. Accordingly, the duty of S which is a sign signal (the output of the comparator 15) does not become 50% and the sign signal S takes the waveform shown in FIG. 5C. The sign signal S is integrated at the integrator 7 and this integrated value is used as a polarity discriminating signal PF as shown in FIG. 5D.

The polarity discriminating signal PF is integrated in the direction that the current change rate of the current detection value Idc is increased. In FIG. 5, the current change rate is large during the periods that the current detection value Idc takes the negative value. As a result, the polarity discriminating signal PF is decreased in the negative direction. When the polarity discriminating signal PF becomes negative, the polarities of the magnetic poles are inverted and the correction quantity calculator 17 outputs an offset of 180 degrees so as to correct the value of the magnetic pole positions θc. When the polarities of the magnetic poles are aligned with each other, the polarity discriminating signal PF is increased in the positive value and no correction of the magnetic pole positions θc is not performed, In this manner, by applying the minute voltage to the magnetic pole estimation axis and observing the positive and negative current flow periods of the produced ripple current, the discrimination of the polarities of magnetic poles can be realized. The integrator 7 shown in FIG. 4 is provided for enhancing the polarity estimation accuracy. When the motor with the extremely large magnetic saturation is used, it may be possible to estimate the polarities directly from the duty ratio of the sign signal S.

The explanation has been made heretofore with respect to the case in which DC components are not contained in the current ripple components. However, even when the current ripple components include the DC components, the same advantageous effects can be obtained by extracting only the ripple components (for example, by subtracting the mean value). This is because that, as shown in FIG. 2B and FIG. 3B, the magnetic saturation characteristics of the motor is changed in a curve with respect to the current detection value Idc and even when the DC bias is contained, the change of inductance derived from the saturation is present to some extent. Although ensuing embodiments are explained hereinafter assuming that the current detection values do not contain DC components for brevity's sake, the same goes for these embodiments, Subsequently, the second embodiment of the present invention is explained. In the first embodiment, the polarity estimation is performed by comparing the negative time and the positive time of the current ripples. To realize this polarity estimation using a microcomputer, it is necessary to rapidly detect or sample the current and hence, the realization of polarity estimation becomes difficult. Further, although it is possible to perform the polarity estimation in hardware using an analogue circuit, this necessitates peripheral circuits.

Accordingly, in the second embodiment, to solve such problems, a minute voltage change is generated on the dc axis which constitutes the estimation axis of the magnetic flux in the inside of the motor, the current which flows in the motor is observed, and, with respect to ripple components contained in the observed value, the current change rate at the positive side and the negative side thereof is measured so as to discriminate the polarities of the magnetic poles in the inside of the motor.

The second embodiment can be realized by exchanging the polarity discrimination 14 shown in FIG. 1 with a polarity discrimination 14B shown in FIG. 6. A delaying unit 18 of the polarity discrimination 14B delays an input signal by 1 sample. An adder 10 obtains the deviation between the input signal and an input signal outputted from the delaying unit 18 and an absolute value calculator 19 calculates an absolute value of a signal transmitted from the adder 10. An inverter 20 inverts a sign of the input signal, a multiplier 21 calculates a product of two input signals, and an integrator 7B integrates the multiplication result. A correction quantity calculator 17, as in the case of the first embodiment, outputs a phase offset Δθp in response to the value of an evaluation function PF from the integrator 7B.

Subsequently, the manner of operation of a polarity discriminator 14B is explained in conjunction with FIG. 7. Here, assume that the operation is executed in a digital control system which sets the calculation cycle to Tid. The minute signal vhd is given such that the minute signal vhd is changed in synchronism with the calculation period Tid as shown in FIG. 7A. In this embodiment, the cycle of the minute voltage change component vhd is set to be four times as large as the calculation period Tid. Here, the current detection value Idc is changed as shown in FIG. 7B. Since the current detection value Idc is sampled at a point of time that the calculation period Tid starts, waveforms such as IdcK, Idc (k−1) are read into the inside of the controller. IdcK is inputted to the polarity estimator 14B shown in FIG. 6 and the difference between IdcK and the previous value Idc (k−1), that is, the current change rate ΔIdc is calculated. Thereafter, in the absolute value calculator 19, an absolute value (|ΔIdc|) of the current change rate shown In FIG. 7C is calculated, and a product of the absolute value |ΔIdc| and a sign signal S2 shown in FIG. 7D is obtained.

The sign signal S2 makes use of the waveform of the minute voltage change component vhd. Although the waveform of the current detection value Idc per se may be used as a matter of course, there is a possibility that a delicate point in the vicinity of a 0 cross is erroneously detected and hence, the waveform of the reliable minute voltage change component vhd is used. Provided that the frequency of the minute voltage change component vhd is sufficiently high, it is assumed that the phase (sign) of the ripple components of the current detection value Idc is completely fixed with respect to the minute voltage change component vhd (the voltage drop due to the resistance can be ignored).

The product of the absolute value |ΔIdc| and the sign signal S2 becomes ΔPF2 shown in FIG. 7E. This product ΔPF2 forms a waveform which has a negative offset when the negative-side current change rate is large and has a positive offset when the positive-side current change rate becomes large. Accordingly, by discriminating an offset quantity of the product ΔPF2, the polarities can be discriminated.

Figure 7:
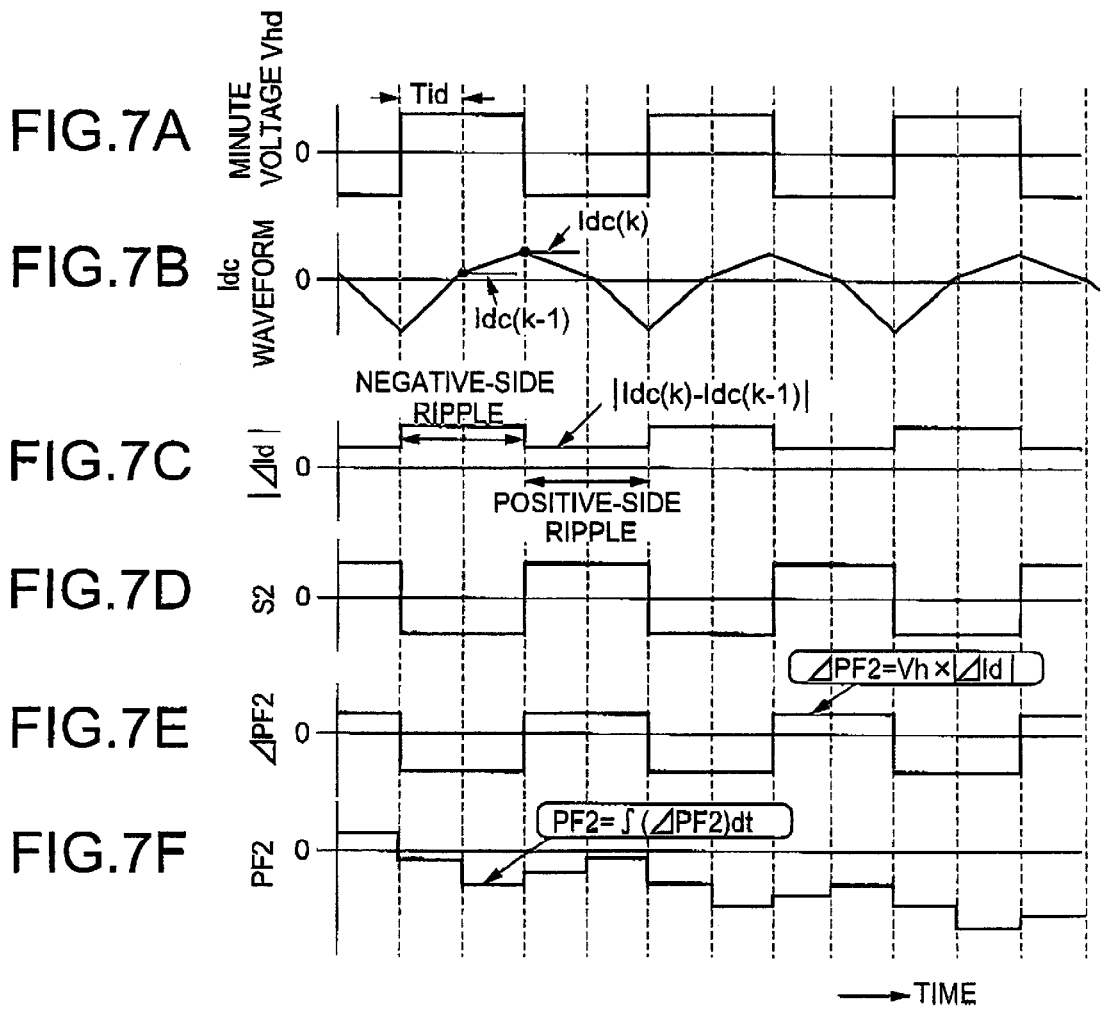
FIG. 7A is a graph showing a minute voltage change component vhd according to a second embodiment.
FIG. 7B is a graph showing a waveform of a current detection value Idc according to the second embodiment.
FIG. 7C is a graph showing a waveform of an absolute value |ΔIdc| of a current change rate according to the second embodiment.
FIG. 7D is a graph showing a waveform of a sign signal S2 according to the second embodiment.
FIG. 7E is a graph showing a waveform of a product ΔPF2 of the absolute value |ΔIdc| of the current change rate and the sign signal S2 according to the second embodiment.
FIG. 7F is a graph showing a waveform of a polarity signal PF2 which is a result of integration of the product ΔPF2 according to the second embodiment.

In this embodiment, by integrating the product ΔPF2 with the use of the integrator 7B, the polarity signal PF2 which is the result of the integration is obtained as shown in FIG. 7F and the sign of the offset is obtained based on this polarity signal PF2. In the case shown in FIG. 7, the polarity signal PF2 is decreased in the negative and the polarity is inverted. The correction quantity calculator 17 calculates an offset quantity given to the electrical angle position (phase) θc as in the case of the first embodiment.

As described above, with the use of the second embodiment according to the present invention, the practical polarity discrimination suitable for the digital control system can be realized. The integrator 7B shown in FIG. 6 is provided for obtaining the offset quantity of ΔPF2 with accuracy. Accordingly, with respect to the motor having the remarkable magnetic saturation, the polarity may be instantaneously estimated based on the mean value of ΔPF2 or the like.

Subsequently, a third embodiment of the present invention is explained in conjunction with FIG. 8 to FIG. 10. The first and second embodiments perform the polarity discrimination after the magnetic pole position estimation. In this third embodiment, however, the magnetic pole position estimation and the polarity discrimination are executed in parallel. That is, a dc axis which is an estimation axis of a magnetic flux in the inside of a motor and a qc axis which is an axis perpendicular to the dc axis are obtained, the estimation of the magnetic pole positions in the inside of the motor is performed using a current change rate component observed on the qc axis, and the polarity of the magnetic pole can be discriminated in parallel with the estimation of the magnetic pole positions.

Figure 8:
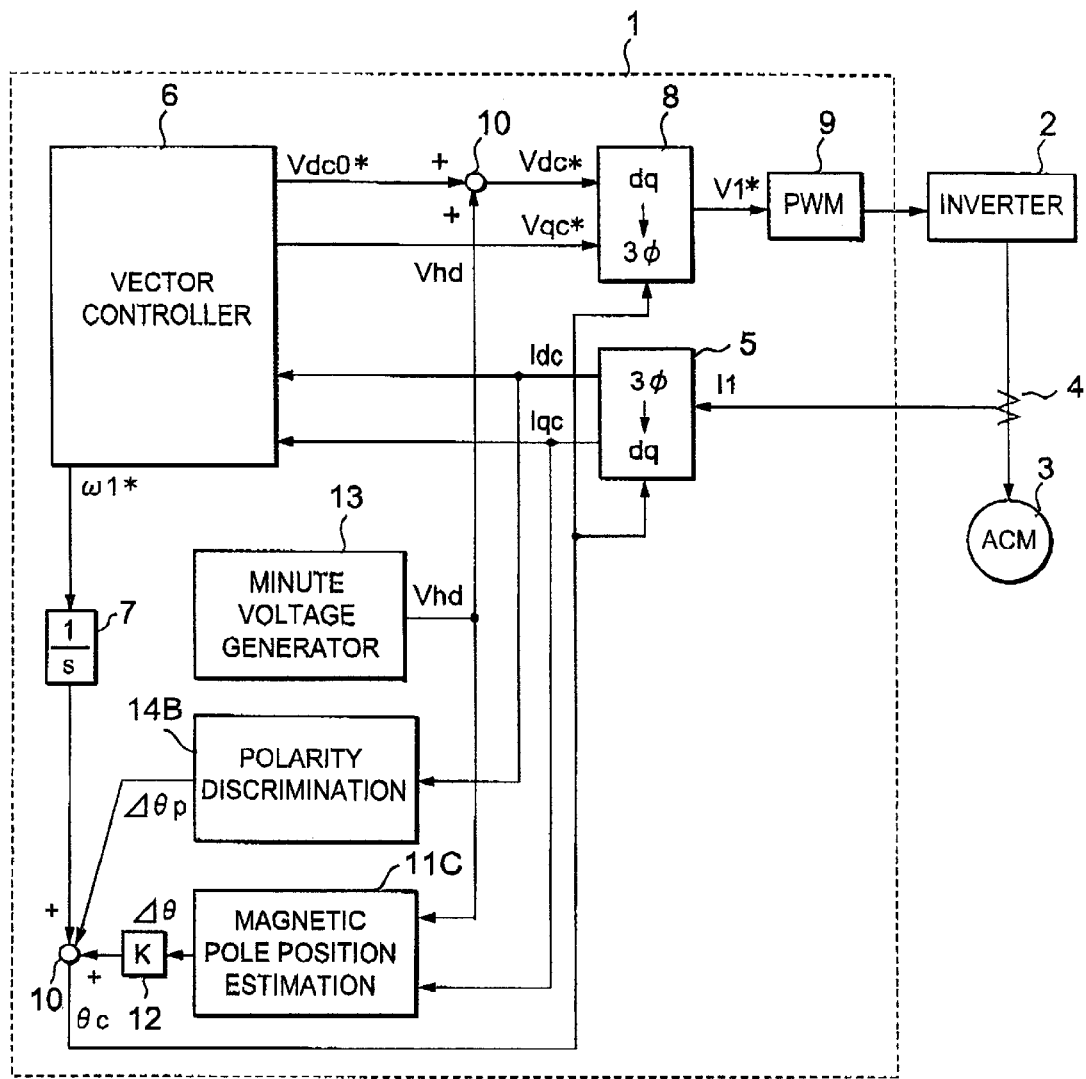
FIG. 8 is a constitutional view of a polarity discriminator according to a third embodiment.

In FIG. 8, numerals 1 to 10 and 12, 13 indicate elements which are identical with elements indicated by the same symbols in the first embodiment explained in conjunction with FIG. 1. Further, a polarity estimator 14B is identical with the polarity estimator of the second embodiment which is explained in conjunction with FIG. 6. Although the manner of operation of this embodiment is basically equal to the manner of operation of the previously mentioned second embodiment, in this embodiment, the magnetic pole position estimation calculation is performed at a magnetic pole position estimator 11C simultaneously with the polarity discrimination. In the magnetic pole position estimator 11C, the magnetic pole position detection is performed based on the minute voltage change component vhd and the current detection value Iqc.

Here, the operation principle of the magnetic pole position estimator 11C is explained. The voltage equation of the synchronous motor having the electrically salient characteristics becomes a following equation (1) when it is expressed on dq coordinate axes using a magnetic pole axis of a motor as the reference.

$$\begin{bmatrix} V_d \\ V_q \end{bmatrix} = \begin{bmatrix} r + pL_d & -\omega_1 L_q \\ \omega_1 L_d & r + pL_q \end{bmatrix} \begin{bmatrix} I_d \\ I_q \end{bmatrix} + \begin{bmatrix} 0 \\ k_E \omega_1 \end{bmatrix} \quad (1)$$

In the equation (1), Vd, Vq respectively indicate voltages applied to the motor, Id, Iq indicate motor currents, r indicates a stator resistance of the motor, Ld indicates a d-axis inductance, Lq indicates a q-axis inductance, $\omega 1$ indicates an electrical angle frequency, KE indicates a reverse voltage constant, and p indicates a differential operator.

When an axial error $\Delta\theta$ is present between the dq axes and a coordinate dcqc axes on a control is present, the voltage equation of the motor on the dc qc axis becomes a following equation (2).

$$\begin{bmatrix} V_{dc} \\ V_{qc} \end{bmatrix} = \begin{bmatrix} r + pL_{dc} + \omega_1 L_{dqc} & -\omega_1 L_{qc} - pL_{dqc} \\ \omega_1 L_{dc} - pL_{dqc} & r + pL_{qc} - \omega_1 L_{dqc} \end{bmatrix} \begin{bmatrix} I_{dc} \\ I_{qc} \end{bmatrix} + k_E \omega_1 \begin{bmatrix} \sin\Delta\theta \\ \cos\Delta\theta \end{bmatrix} \quad (2)$$

wherein, $L_{dc} = L_0 + \Delta L \cos 2\Delta\theta$ $L_{qc} = L_0 - \Delta L \cos 2\Delta\theta$ $L_{dqc} = \Delta L \sin 2\Delta\theta$ provided that $L_0 = \dfrac{L_d + L_q}{2} \quad \Delta L = \dfrac{L_d - L_q}{2}.$ Further, a following equation (3) is obtained from the equation (2).

$$p\begin{bmatrix} I_{dc} \\ I_{qc} \end{bmatrix} = \dfrac{1}{L_d L_q} \begin{bmatrix} L_{qc} & L_{dqc} \\ L_{dqc} & L_{dc} \end{bmatrix} \quad (3)$$

$$\left\{ \begin{bmatrix} V_{dc} \\ V_{qc} \end{bmatrix} - \begin{bmatrix} r + \omega_1 L_{dqc} & -\omega_1 L_{qc} \\ \omega_1 L_{dc} & r - \omega_1 L_{dqc} \end{bmatrix} \begin{bmatrix} I_{dc} \\ I_{qc} \end{bmatrix} - k_E \omega_1 \begin{bmatrix} \sin\Delta\theta \\ \cos\Delta\theta \end{bmatrix} \right\}$$

Here, by respectively adding minute voltage change components vhd, vhq to the voltages vdc and vqc, a following equation (4) is obtained.

$$p\begin{bmatrix} I_{dc} \\ I_{qc} \end{bmatrix} = \dfrac{1}{L_d L_q} \begin{bmatrix} L_{qc} & L_{dqc} \\ L_{dqc} & L_{dc} \end{bmatrix} \quad (4)$$

$$\left\{ \begin{bmatrix} V_{dc} + v_{hd} \\ V_{qc} + v_{hq} \end{bmatrix} - \begin{bmatrix} r + \omega_1 L_{dqc} & -\omega_1 L_{qc} \\ \omega_1 L_{dc} & r - \omega_1 L_{dqc} \end{bmatrix} \begin{bmatrix} I_{dc} \\ I_{qc} \end{bmatrix} - k_E \omega_1 \begin{bmatrix} \sin\Delta\theta \\ \cos\Delta\theta \end{bmatrix} \right\}$$

With the addition of the minute voltage change components vhd, vhq, the minute changes are generated in the current detection values Idc, Iqc. Assuming that the change of the minute voltage change components vhd, vhq occurs within a short time and does not contribute to basic wave components, a state equation concerning with the current detection values Idc, Iqc becomes a following equation (5).

$$p\begin{bmatrix} I_{dch} \\ I_{qch} \end{bmatrix} = \dfrac{1}{L_d L_q} \begin{bmatrix} L_{qc} & L_{dqc} \\ L_{dqc} & L_{dc} \end{bmatrix} \begin{bmatrix} v_{hd} \\ v_{hq} \end{bmatrix} \quad (5)$$

To obtain the qc axis component of the equation (5) by assuming minute voltage change component vhq as vhq=0 and expressing the rent change quantity within the minute period Tid as $\Delta$Idc, $\Delta$Iqc, a following equation (6) is established.

$$\dfrac{\Delta I_{qc}}{T_{id}} = \dfrac{1}{L_d L_q} L_{dqc} v_{hd} \quad (6)$$

$$= \dfrac{1}{L_d L_q} \dfrac{L_d - L_q}{2} \sin(2\Delta\theta) v_{hd}$$

From the equation (6), following equations (7), (8) are obtained.

$$\sin(2\Delta\theta) \cong 2\Delta\theta = \dfrac{2 L_d L_q}{L_d - L_q} \dfrac{\Delta I_{qc}}{v_{hd} \Delta t} \quad (7)$$

$$\Delta\theta = \dfrac{L_d L_q}{L_d - L_q} \dfrac{\Delta I_{qc}}{v_{hd} \Delta t} \quad (8)$$

It is understood from the equation (8) that the axial error $\Delta\theta$ can be estimated by giving the minute voltage change.

Figure 9:
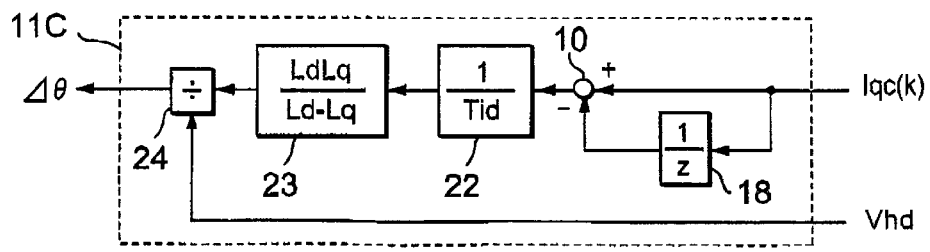
FIG. 9 is a constitutional view of a magnetic pole position estimator according to the third embodiment.

FIG. 9 is a block diagram for realizing the magnetic pole position estimation calculation of the equation (8). An adder 10 obtains the deviation between an input signal IqcK and an input signal Iqc (k−1) outputted from a delaying unit 18, that is, the current change rate $\Delta$Iqc. This current change rate $\Delta$Iqc is multiplied by respective gain times of proportional gain setting units 22, 23 and finally is divided with the value of minute voltage change component vhd by a divider 24 whereby the axial error $\Delta\theta$ is obtained.

In response to the axial error $\Delta\theta$ obtained by the above-mentioned calculation, the magnetic pole positions are converged to either 0 degree or 180 degrees. The polarity discrimination is executed at the polarity discriminator 14B explained in the second embodiment. In this embodiment, it becomes possible to perform the magnetic pole position estimation and the polarity discrimination in parallel. This mode of operation is explained in conjunction with FIG. 10.

In FIG. 10, the magnetic pole position estimation and the polarity discrimination are simultaneously started at a point of time t=0. As shown in FIG. 10A, the estimation position θc of the magnetic pole has started the gradual conversion thereof. This conversion speed is determined by the magnitude of the correction gain given by the correction unit 12 (FIG. 8). On the other hand, the polarity discriminator 14B executes the estimation of the polarity. As shown in FIG. 10C, the value of the polarity signal PF2 is changed. In the course of the conversion of the magnetic pole position estimation, at a point of time tp, the polarities are discriminated based on the value of the polarity signal PF2. In the case of FIG. 10, since the polarities are inverted, an offset quantity of 180 degrees is added. The magnetic pole position estimation is continued even after the polarity discrimination and θc is finally aligned with θ.

The above-mentioned constitution forms the third embodiment of the present invention. According to this embodiment, the polarity discrimination of the magnetic pole can be performed simultaneously with the magnetic pole position estimation calculation so that the time from the starting to the completion of the estimation can be largely improved.

Although the example which uses the equation (8) in the magnetic pole position estimation is illustrated in the explanation of this embodiment, the magnetic pole position discrimination can be performed in parallel with the polarity estimation in other magnetic pole position estimation methods in the same manner as this embodiment.

Subsequently, the fourth embodiment of the present invention is explained. In the above-mentioned third embodiment, the magnetic pole position estimation and the polarity discrimination are executed in parallel. The fourth embodiment relates to the cycle of the minute voltage change component vhd which is used in such an execution. The minute voltage change component vhd is comprised of high frequency components which are supplied to the motor and hence, although the minute voltage change component vhd is necessary for the magnetic pole position estimation and the polarity discrimination, it is unnecessary for the original motor control. Accordingly, it is preferable to restrict a quantity of the minute voltage change component vhd as small as possible.

To perform the polarity discrimination, with respect to the calculation cycle or period Tid, it is necessary to set the cycle of the minute voltage change component vhd to at least 4=Tid. Accordingly, the higher harmonic component is increased corresponding to the superposition of the minute voltage change component vhd and this may give rise to a loss or a torque pulsation. To suppress these phenomena, it is preferable to suppress the amplitude of the minute voltage change component vhd as small as possible or to make the frequency as high as possible. On the other hand, in performing the magnetic pole position estimation calculation, the cycle of the minute voltage change component vhd can be arbitrarily set so that it is preferable to change over the frequency of the minute voltage change component vhd after the result of the polarity discrimination is confirmed (after the polarities are recognized).

The manner of operation of the fourth embodiment is explained in conjunction with FIG. 11. The cycle of the minute voltage change component vhd is changed over at a point of time ts. Here, the polarity discrimination must be completed at least before the point of time ts. As shown in the drawing, by cutting the cycle of the minute voltage change component vhd from the point of time ts in half, the current ripples are also reduced in half so that the increase of torque ripples and the loss derived from the higher harmonics can be reduced.

The fifth embodiment of the present invention is explained. In the above-mentioned first to fourth embodiments, the polarity discrimination of the magnetic pole and the magnetic pole position estimation are simultaneously performed. These embodiments are effective with respect to the motor having the electrically salient characteristics. However, with respect to a permanent magnet type synchronous motor which is not electrically salient, the current situation is that the magnetic pole position estimation method which exhibits a high response is not established. The fifth embodiment of the present invention is served for providing a magnetic pole position estimation method for a motor which is not electrically salient.

In this fifth embodiment, in the inside of a controller, an estimation magnetic flux axis dc in the inside of a motor and a qc axis which constitutes an axis perpendicular to the dc axis are obtained, the minute changes are given to voltage commands on these two axes, the current which flows into the motor is observed on the dc axis and the qc axis, and, with respect to the ripple components contained in the current values which are observed on the dc axis and the qc axis, the magnetic pole positions in the inside of the motor are estimated based on the current flow times at the positive side and the negative side of the ripple components.

Figure 12:
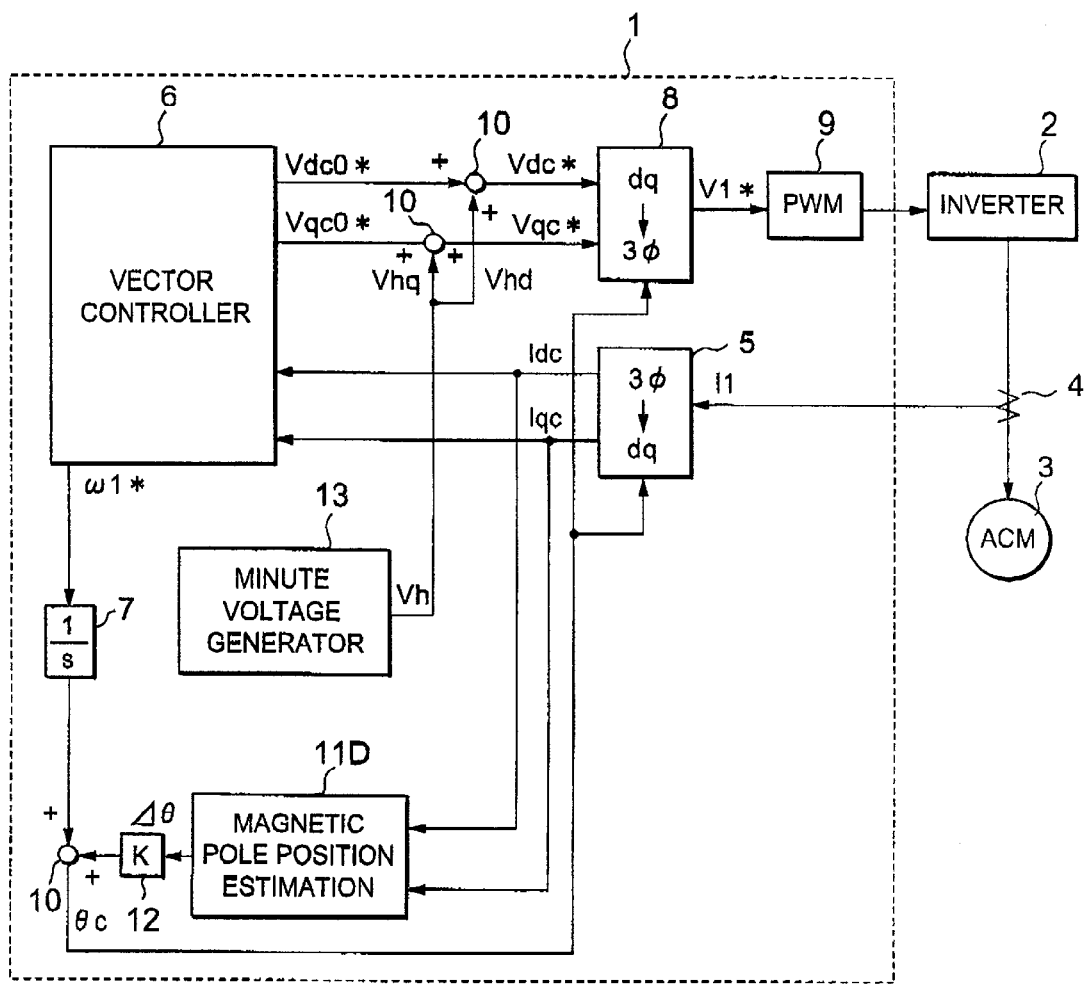
FIG. 12 is a constitutional view of a system according to a fifth embodiment.

FIG. 12 is a constitutional view of a system of the fifth embodiment. In FIG. 12, numerals 1 to 10 and 12, 13 indicate elements which are identical with the elements indicated by the same numerals in the first embodiment which is explained in conjunction with FIG. 1. However, in this embodiment, the motor 3 is an AC motor which is not electrically salient.

A magnetic pole position estimator 11D constitutes a characterizing portion of this embodiment.

Different from the previous embodiments, in the fifth embodiment, an output of a minute voltage generator 13 is added to both of the dc axis and the qc axis. As a result, the ripples are generated in both of the currents Idc, Iqc. The magnetic pole position estimator 11D takes in both currents Idc and Iqc and estimates the magnetic pole positions.

Figure 13:
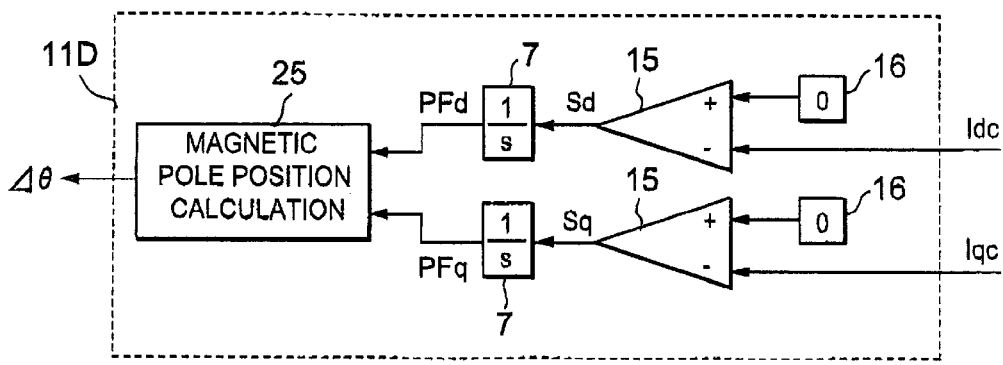
FIG. 13 is a constitutional view of a magnetic pole position estimator according to the fifth embodiment.

FIG. 13 shows the constitution of the magnetic pole position estimator 11D. Numerals 7, 15, 16 indicate elements which are identical with the elements shown in FIG. 4. In principle, the magnetic pole position estimator 11D is characterized by providing the polarity estimator 14 shown in FIG. 4 to every component of the dcqc axes. Outputs PFd, PFq of respective integrators 7, 7 are changed in the direction of the signs having the large current change rates with respect to the currents on respective axes. The direction having the large current change rate means direction in which the magnetic flux of the magnet is positive. By making use of this feature, the magnetic pole positions can be estimated.

Figures 14, 15:
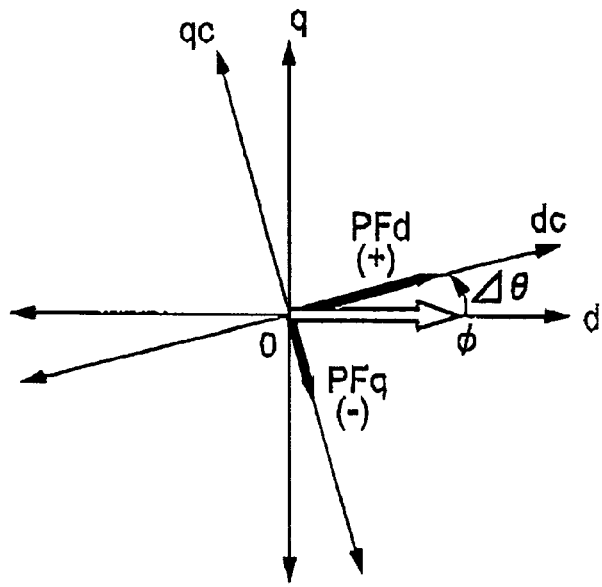
FIG. 14 is a vector diagram showing the operation of the magnetic pole position estimator according to the fifth embodiment.
FIG. 15 is a table which is served for the calculation of the magnetic pole positions according to the fifth embodiment.

FIG. 14 shows the relationship between the outputs PFd, PFq of the integrators 7,7 and the magnetic pole axis using vectors. When the dcqc axes and the dq axes have the relationship shown in the drawing, the outputs PFd, PFq of the integrators 7,7 are changed in the axial directions close to the magnetic pole. Accordingly, the output PFd of the integrator 7 takes the positive value and the output PFq of the integrator 7 takes the negative value. Accordingly, in this case, it is possible to specify or define the axial error Δθ within a range of 0 degree to 90 degrees.

In this manner, based on the sign of the output PFd and the sign of the output PFq, the magnetic pole position calculator 25 performs the calculation of the axial error. In the inside of the magnetic pole position a,calculator 25, a table shown in FIG. 15 which determines the relationship table between outputs PFd, PFq of the integrators 7,7 and the axial error is stored and hence, it is possible to specify the axial error AG, According to this method, without performing the polarity discrimination, it is possible to directly specify the magnetic pole position within a range of 90 degrees.

As has been explained above, according to the fifth embodiment of the present invention, even with respect to the motor which is not electrically salient, by making use of the change of inductance due to the magnetic saturation, it is possible to rapidly specify the region where the magnetic pole position is present.

Then, the sixth embodiment of the present invention is explained. In the fifth embodiment, as in the case of the embodiment shown in FIG. 1, the polarity estimation is performed by comparing the positive cycle and the negative cycle of the current ripple waveform with each other and it is necessary to rapidly detect (sample) the current to realize this polarity estimation using a microcomputer. Further, although it is possible to perform the polarity estimation in hardware using an analogue circuit, there arises a problem that peripheral circuits which are mounted from outside are necessary. The sixth embodiment provides the polarity position estimation method which can solve such a problem.

In the sixth embodiment, minute voltage changes are given to two voltage commands on a dc axis and a qc axis, an electric current which flows in a motor is observed on the dc axis and the qc axis, the current change rates of ripple components contained in the observed current are separately detected at the positive side and the negative side of the ripple components and the magnetic pole positions in the inside of the motor are estimated based on values of these change rates.

Figure 16:
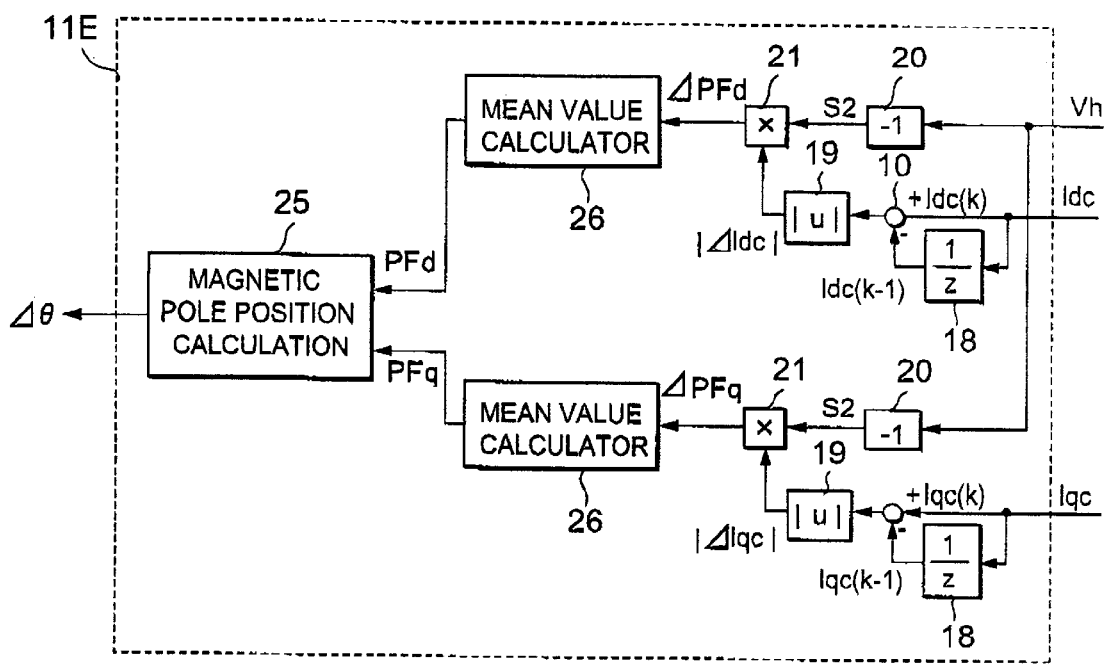
FIG. 16 is a constitutional view of a magnetic pole position estimator according to a sixth embodiment.

FIG. 16 shows a magnetic pole position estimator 11E of the sixth embodiment. Numerals 10, 18, 19, 20, 21 indicate elements which are identical with those elements shown in FIG. 6 which are indicated by the same numerals. Further, numeral 25 indicates an element which is identical to the element shown in FIG. 13 which is indicated by the same numeral. Numeral 26 indicates a mean value calculator which calculates the mean value of the input values.

FIG. 17 shows operational waveforms of respective portions. In the sixth embodiment, in a premise of the digital control, the current change rate is calculated based on the difference between the current detection values Idc and Iqc so as to estimate the magnetic pole positions. Accordingly, the manner of operation per se of this embodiment is similar to the manner of operation of the embodiment shown in FIG. 6. Due to the minute voltage change component vhd indicated in FIG. 17A, the ripples are generated in the current detected values Idc, Iqc as shown in FIG. 17B and FIG. 17D. With respect to respective axes, the absolute value calculation of the current change rates is performed by absolute value calculators 19, 19 so as to obtain absolute values |ΔIdc|, |ΔIqc| of the current change rates shown in FIG. 17C and FIG. 17E. In multipliers 21, 21, with respect to the respective absolute values |ΔIdc|, |ΔIqc|, the multiplication with a sign signal S2 shown in FIG. 17F is performed so that the waveform of a product ΔPFd shown in FIG. 17G and the waveform of a product ΔPFq shown in FIG. 17I are obtained. Here, mean values PFd, PFq of the products ΔPFd and ΔPFq are obtained by the mean value calculator 26 and the mean values PFd, PFq are outputted at a cycle Tsh which is twice as long as the calculation cycle Tid as shown in FIG. 17H and FIG. 17J.

Figure 18:
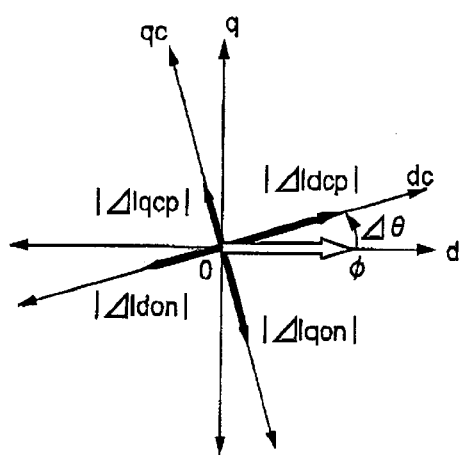
FIG. 18 is a vector diagram showing the magnitude of the current change rate according to the sixth embodiment.
Figure 19:
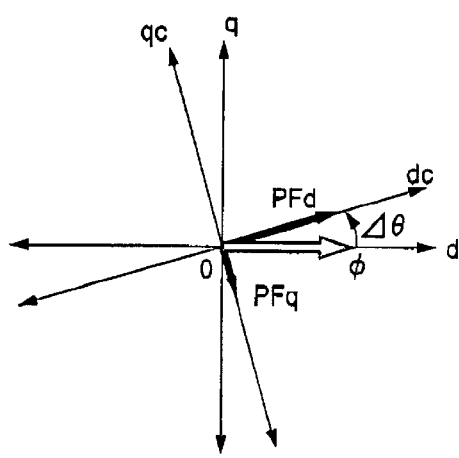
FIG. 19 is a vector diagram showing the operation of a magnetic pole position estimator according to the sixth embodiment.

The magnetic pole position calculator 25 specifies the magnetic pole positions in accordance with the table 15 based on the signs of the outputs PFd, PFq of the mean value calculator 26. To show the above operations using a vector diagram, they are expressed as shown in FIG. 18 and FIG. 19. As shown in FIG. 18, the change rates of the current ripples at respective axes take the larger values as they approach closer to the magnetic pole axis. These mean values approach in the direction in which the magnetic flux Φ of the permanent magnet is present as shown in FIG. 19.

Subsequently, the seventh embodiment of the present invention is explained. The sixth embodiment shown in FIG. 6 is directed to the motor which is not electrically salient. There arises a following problem to apply the sixth embodiment to a motor which is electrically salient. With respect to the motor which is electrically salient, as indicated in the above-mentioned equation (5), when there is the axial error Δθ, an interference term exists between the dc axis and the qc axis. Accordingly, when the minute voltage change component is simultaneously given to the voltage commands on both axes, there may be a case in which the magnetic pole positions cannot be specified due to the influence of this interference component.

The seventh embodiment provides a magnetic position estimation method which can solve such a problem and is also applicable to the motor which is electrically salient. That is, at the time of performing the magnetic pole position estimation methods of the fifth embodiment or the sixth embodiment, with respect to the minute change which is added to the voltage commands on the dc axis and the qc axis, by generating the minute change on the dc axis and the qc axis alternately, the above-mentioned problem can be solved.

Figure 20:
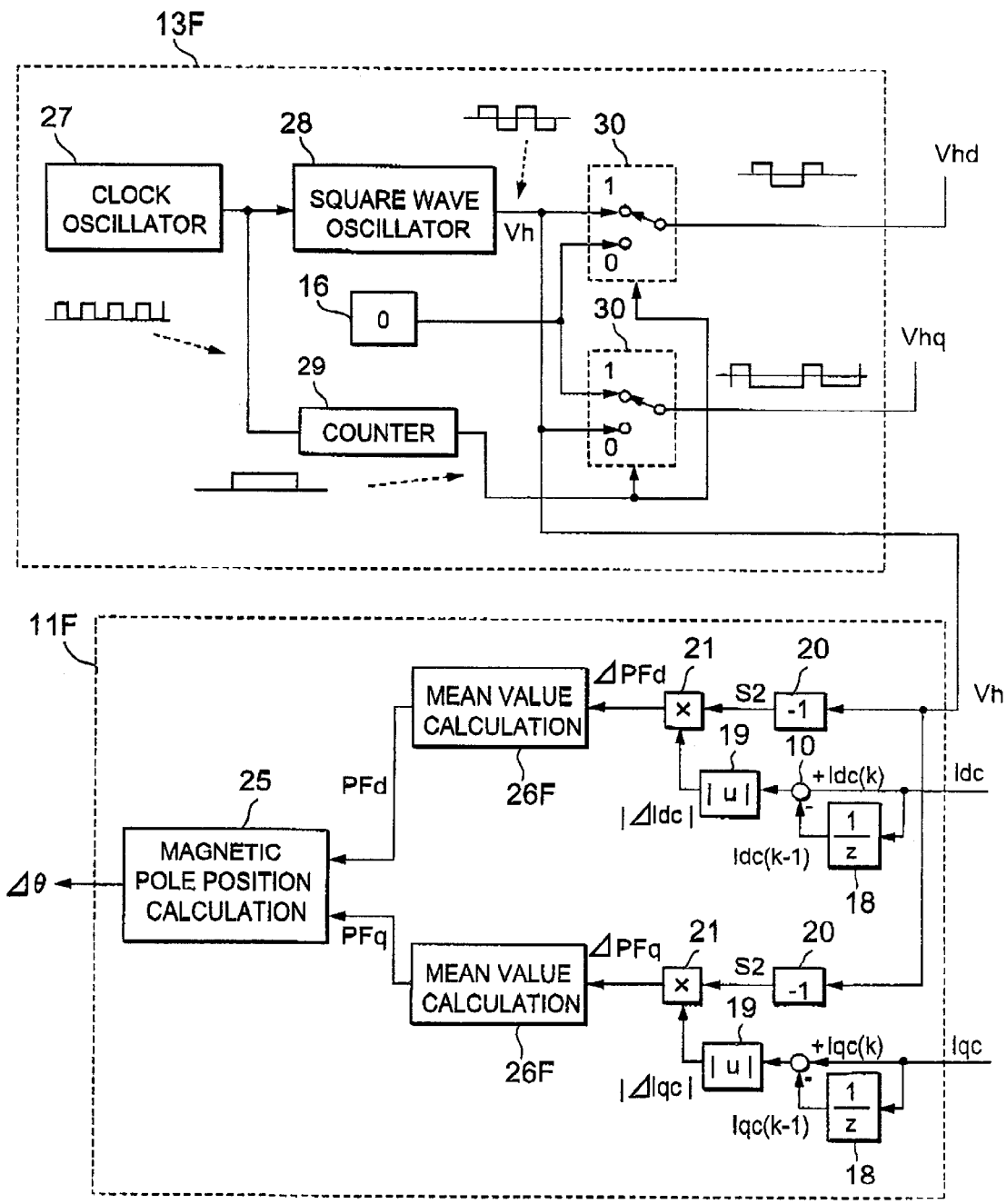
FIG. 20 is a constitutional view of a minute voltage generator and a magnetic pole position estimator according to a seventh embodiment of the present invention.

In FIG. 20, a minute signal generator 13F and a magnetic pole position estimator 11F according to the seventh embodiment are shown. This system is constituted by replacing the minute voltage generator 13 and the magnetic pole position estimator 11D shown in FIG. 12 with such minute signal generator 13F and magnetic pole position estimator 11F.

In FIG. 20, numerals 10, 16, 18, 19, 20, 21, 25 respectively indicate elements which are identical with element of the previous embodiments indicated by the same numerals. The magnetic pole position estimator 11F includes mean value calculators 26F which obtain the mean value of cycles each of which corresponds to 8 calculation cycles Tid with respect to the input. With respect to constitutions other than the above constitution, the magnetic pole position estimator 11F substantially has the same constitution with the magnetic pole position estimator 11E which is explained in conjunction with FIG. 16. Further, the minute voltage generator 13F includes a clock oscillator 27 which generates pulses having a square waveform, a square waveform oscillator 28 which generates square waveforms upon receiving an output of the clock oscillator 27, a counter 29 which counts the number of output pulses of the clock oscillator 28 and switches 30, 30 which change over inputs in response to an output signal from the counter 29.

FIG. 21 shows operational waveforms of respective portions. The clock oscillator 27 of the minute voltage generator 13F outputs the clock signals which is in synchronism with the control calculation cycle Tid. The square oscillator 28 divides the clock signal in two frequencies and forms the voltage change vh which becomes the source of the minute voltage change component vhd. On the other hand, in the counter 29, the clock signal is divided in four frequencies and they are used as changeover signals of switches 30, 30. In the drawing, the switches 30 change over the input to an "1" side when the value of the counter 29 is set to 1 and to a "0" side when the value of the counter 29 is set to "0".

The outputs from the respective switches 30, 30, that is, the waveforms of the minute voltage change components vhd, vhq from the minute voltage generator 13F become waveforms shown in FIG. 21A, FIG. 21D. Eventually, to the output voltages on the dc axis and the qc axis, these minute voltage change components vhd, vhq are alternately applied. Since the minute voltage change components vhd, vhq are alternately applied in such a manner, it is unnecessary to take the interference component between the dc axis and the qc axis into account so that it is sufficient to calculate the current change rates with respect to the minute voltage change components on respective axes by dividing with time.

The magnetic pole position estimator 11F performs the operation which is substantially equal to that of the magnetic pole position estimator 11E of the sixth embodiment. In the absolute value calculators 19, 19, the absolute value calculation of the current change rates of the current detection values Idc, Iqc shown in FIG. 21B, FIG. 21E is performed so as to obtain the absolute value |ΔIdc|, |ΔIqc| of the current change rates shown in FIG. 21C and FIG. 21F. In multipliers 21, 21, with respect to the respective absolute values |ΔIdc|, |ΔIqc| the multiplication with a sign signal S2 shown in FIG. 21G is performed so that a waveform of a product ΔPFd made of the absolute value |ΔIdc| and the sing signal S2 shown in FIG. 21H and a waveform of a product ΔPFq made of the absolute value |ΔIqc| and the sing signal S2 shown in FIG. 21J are obtained. Here, mean values PFd, PFq of the products ΔPFd and ΔPFq having cycles each of which corresponds to 8 calculation cycles Tid as mentioned previously are obtained in the mean value calculator 26F and these mean values PFd, PFq are outputted as shown in FIG. 21I and FIG. 21K. In the magnetic pole position calculators 25, the magnetic pole positions are specified in accordance with the table shown in FIG. 15 based on the signs of the outputs PFd, PFq of the mean value calculator 26F.

In this manner, with the use of the magnetic pole position estimator 11F of this embodiment, also with respect to the motor which is electrically salient, the magnetic pole positions can be directly specified without performing the polarity discrimination.

Subsequently, the eighth embodiment of the present invention is explained. According to the fifth to seventh embodiments, the magnetic pole positions can be specified by using signs of the mean values PFd, PFq in the inside of the magnetic pole position estimator. However, although the region in which the axial error Δθ exists can be specified, the value of the axial error Δθ per se cannot be directly and accurately specified. According to the eighth embodiment which will be explained hereinafter, the axial error Δθ an be directly and accurately obtained.

In this embodiment, using ΔIdcp (current change rate at the positive side of the ripple components of the dc-axis current) which indicates the change rate of current ripple components on the dc axis and the qc axis, ΔIdcn (current change rate at the negative side of the ripple components of the dc-axis current), ΔIqcp (current change rate at the positive side of the ripple components of the qc-axis current) which indicates the change rate of current ripple components on the dc axis and the qc axis and ΔIqcn (current change rate at the negative side of the ripple components of the qc-axis current) all of which indicate the change rates of current ripple components on the dc axis and the qc axis in the sixth embodiment or the seventh embodiment, the axial error Δθ(=θc−θ) between the electrical angle phase θc of the dc,qc axes and the magnetic pole axis phase θ in the inside of the motor is directly obtained whereby the axial error Δθ can be obtained with high accuracy with the use of an equation (10) which is explained later.

Figure 22:
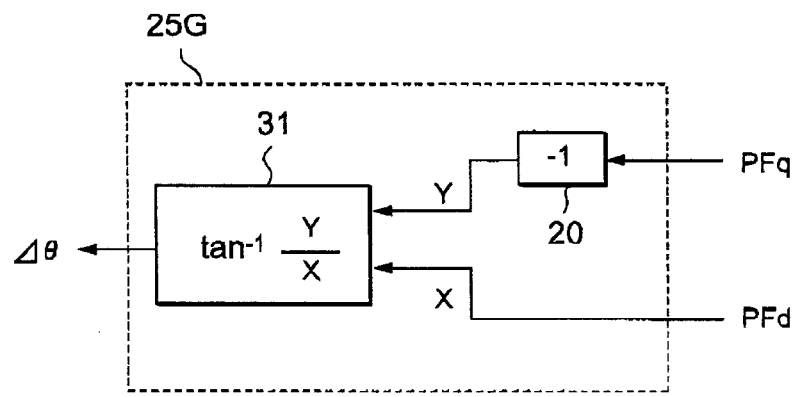
FIG. 22 is a constitutional view of a magnetic pole position calculating unit according to an eighth embodiment of the present invention.

FIG. 22 is a constitutional view of a magnetic pole position calculator 25G according to the eighth embodiment. Here, this magnetic pole position calculator 25G is used in place of the magnetic pole position calculator 25 in FIG. 13, FIG. 16 and FIG. 20. This magnetic pole position calculator 25G includes a sign inverter 20 and an arc-tangent calculator 31 which calculates arc-tangent values with respect to two inputs X,Y.

The outputs PFd, PFq of the mean value calculators 26 which constitute the inputs of the magnetic pole position calculators 25G form, as represented by the vector diagram shown in FIG. 19, the vectors in the direction in which the flux of the permanent magnet exists on the dcqc axes. Accordingly, the axial error Δθ becomes the arc-tangent values of the inputs PFd, PFq of the magnetic pole position calculators 25G as shown in the equation (9).

$$\Delta\theta = \tan^{-1}\frac{-PF_q}{PF_d} \tag{9}$$

Further, when the axial error Δθ is expressed by using the current ripples, it can be calculated by a following equation (10).

$$\Delta\theta = \tan^{-1}\frac{-(|\Delta I_{qcp}| - |\Delta I_{qcn}|)}{|\Delta I_{dcp}| - |\Delta I_{dcn}|} \tag{10}$$

In the above-mentioned equations (9), (10), the axial error Δθ can be specified within a range of ±180 degrees by the calculation while considering the signs of a denominator and a numerator. Accordingly, in this embodiment, the polarity estimation is unnecessary.

As described above, in the eighth embodiment, the magnetic pole positions of the motor which is not electrically salient and the magnetic pole positions of the motor which is electrically salient can be directly and accurately estimated without using the polarity discrimination.

Subsequently, the ninth embodiment of the present invention is explained. In the previous embodiments, the polarity estimation of the magnetic pole positions or the direct acquisition of the magnetic pole positions is performed based on the difference of current change rates by making use of the positive/negative change rates of the current ripple (or the current flow time). This principle is established in a premise that the current ripples are directly relevant to the magnetic saturation.

In the actual motor, however, the element which receive the largest influence of the magnetic saturation is the inductance and it is considered that the result of the change of the inductance becomes apparent in response to the change of the current ripples. This depends on the saturation characteristics of the motor and there may be a case in which it is preferable to estimate the magnetic pole positions based on the inductance.

The ninth embodiment is directed to the magnetic pole position detection method which is based on the change of inductance. At the time of performing the sixth embodiment or the seventh embodiment, with respect to individual positive and negative current change rates of the ripple components on the dc, qc axes, the inverse numbers of the current change rates of respective axes and respective signs are calculated, and the magnetic pole positions (magnetic pole positions including the polarities) in the inside of the motor are estimated based on the calculated values.

Figure 23:
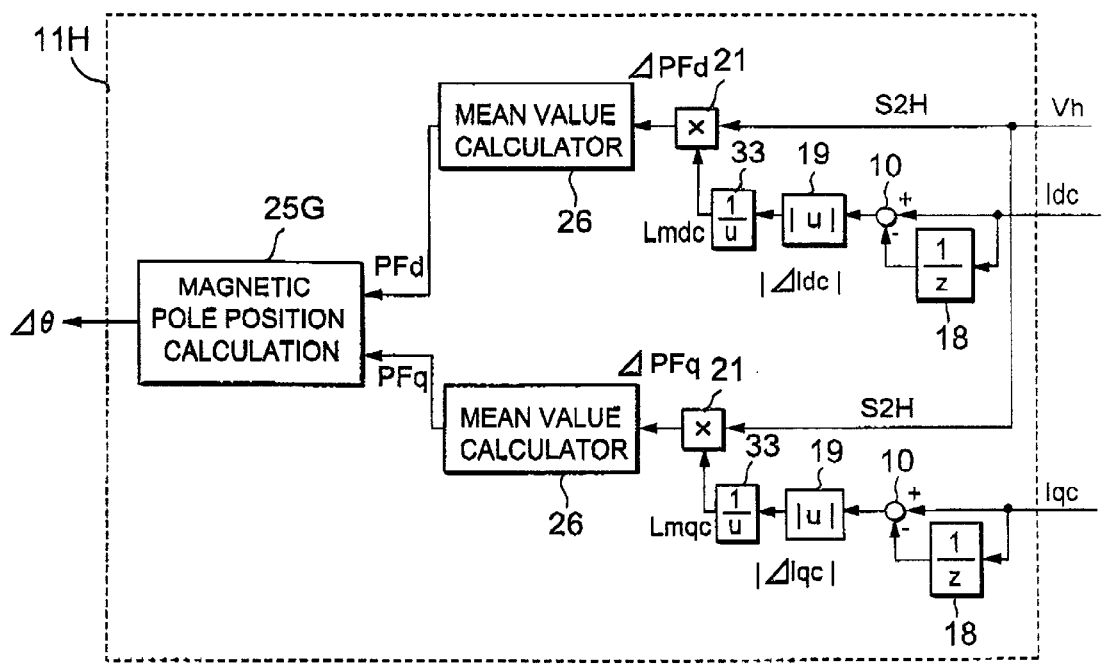
FIG. 23 is a constitutional view of a magnetic pole position estimator according to a ninth embodiment of the present invention.

FIG. 23 shows a magnetic pole position estimator 11H according to the ninth embodiment. This magnetic pole position estimator 11H is used in place of, for example, the magnetic pole position estimators 11E, 11F shown in FIG. 16 or FIG. 20. Numerals 10, 18, 19, 21, 26, 25G indicate elements which are identical with the elements indicated by same numerals in the preceding embodiments. Further, numeral 33 indicates inverse number calculators which calculate the inverse numbers of inputs.

Figure 24:
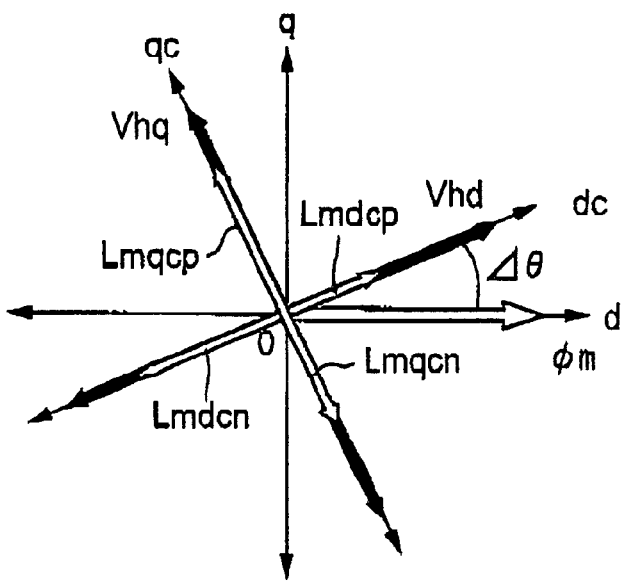
FIG. 24 is a vector diagram showing the change of inductance according to the ninth embodiment.

FIG. 24 is a view which explains the operation principle of this embodiment. In the drawing, the result obtained by calculating the inductance based on the positive and negative current change rates on the dc axis and the qc axis is schematically expressed as a vector diagram. In the vector diagram, Lmdcp indicates an inductance obtained based on the positive-side current change rate of the current ripples which flow in the dc axis, while Lmdcn indicates an inductance obtained based on the negative-side current change rate of the current ripples which flow in the dc axis. Similar definitions are made with respect to the qc axis.

As can be understood from the vector diagram shown in FIG. 24, the inductance in each axis is increased in the direction opposite to the direction in which the magnetic flux of the permanent magnet exists. The magnetic pole positions can be estimated by making use of this principle.

The relationship between the inductance and the current change rate can be expressed by following equations (11), (12).

$$L\frac{dI}{dt} = V \quad (11)$$

$$L = \frac{V}{\frac{dI}{dt}} \quad (12)$$

When the voltage V is fixed, the inductance is proportional to the inverse number of the current change rate. Accordingly, in the magnetic pole position estimator 11H, the inverse numbers of the absolute values of the current ripple are calculated by the inverse number calculator 33 and the magnetic pole positions are estimated by using this calculated values as the inductance Lmdc, Lmqc. What differs from the preceding embodiments lies in that this embodiment directly uses vh which constitutes the sign signal without making vh pass through the inverter.

Figure 25:
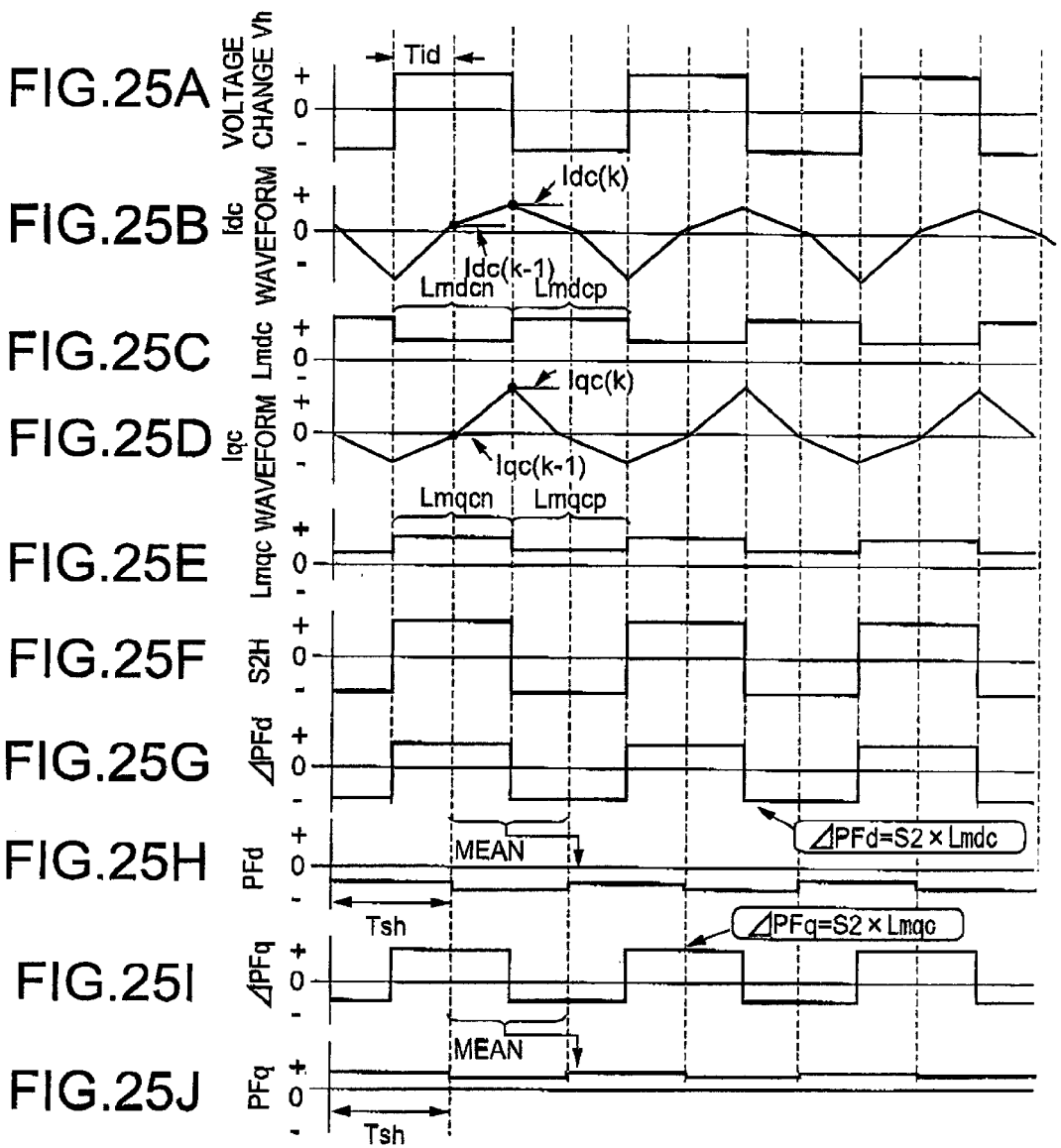
FIG. 25A is a graph showing a waveform of a voltage change vh according to the ninth embodiment.
FIG. 25B is a graph showing a waveform of a current detection value Idc according to the ninth embodiment.
FIG. 25C is a graph showing a waveform of inductance Lmdc obtained from a current change rate of a current ripple which flows along a dc axis according to the ninth embodiment
FIG. 25D is a graph showing a waveform of a current detection value Iqc according to the ninth embodiment.
FIG. 25E is a graph showing a waveform of inductance Lmqc obtained from a current change rate of a current ripple which flows along a qc axis according to the ninth embodiment.
FIG. 25F is a graph showing a waveform of a sign signal S2H according to the ninth embodiment.
FIG. 25G is a graph showing a multiplication result ΔPFd of the inductance Lmdc and the sign signal S2H according to the ninth embodiment.
FIG. 25H is a graph showing a waveform of an output PFd from a mean value calculation unit according to the ninth embodiment.
FIG. 25I is a graph showing a waveform of a multiplication result ΔPFq of the inductance Lmqc and the sign signal S2H according to the ninth embodiment.
FIG. 25J is a graph showing a waveform of an output PFq from a mean value calculation unit according to the ninth embodiment.

FIG. 25 shows the operational waveforms of respective portions of this embodiment. As shown in FIG. 25F and FIG. 25A, a sign signal S2H is on the same phase as a voltage change vh. This is because that the current ripples and the inductance have the inversely proportional relationship between them. Here, with respect to current detection values Idc, Iqc shown in FIG. 25B, FIG. 25D, absolute values |ΔIdc|, |ΔIqc| of the current change rates are obtained using absolute value calculators 19, 19. The inverse numbers Lmdc, Lmqc of these absolute values are obtained using the inverse number calculators 33, 33. These inverse numbers, that is, the inductance Lmdc, Lmqc take waveforms shown in FIG. 25C, FIG. 25E. Then, in multipliers 21, 21, with respect to the inductance Lmdc, Lmqc, the sign signal S2H shown in FIG. 25F is multiplied so that a waveform of the multiplication result ΔPFd shown in FIG. 25G and a waveform of the multiplication result ΔPFq shown in FIG. 25I are obtained. Here, the mean values PFd, PFq of the multiplication results ΔPFd, ΔPFq are obtained using a mean value calculator 26. As shown in FIG. 25H and FIG. 25J, these mean values PFd, PFq are outputted with a cycle Tsh which is twice as long as the calculation period Tid. Thereafter, the magnetic pole positions are estimated in the same manner as the sixth embodiment (FIG. 16, FIG. 17). To express the relationship between the inductance and the axial error by an equation, the relationship is expressed by a following equation (13).

$$\Delta\theta = \tan^{-1}\frac{-(L_{mqcn} - L_{mqcp})}{L_{mdcn} - L_{mdcp}} \quad (13)$$

Here, there arises no problem even when the magnetic pole position calculator 25 shown in FIG. 13 is used in place of the magnetic pole position calculator 25G shown in FIG. 23. Further, it may be possible to adopt the magnetic pole position estimator 11H in the seventh embodiment As described above, with the use of the ninth embodiment, the inductance can be indirectly obtained and then the magnetic pole axis estimation can be performed based on the change of the inductance.

Subsequently, the tenth embodiment of the present invention is explained. In the preceding embodiments, the output of the minute voltage generator is fixed and the polarity estimation of the magnetic pole or the magnetic pole position estimation is performed based on the change rate of the current ripples. However, the magnetic saturation characteristics differ depending on the individual motors and hence, there may arise a case in which the current ripples cannot be detected depending on the sensitivity. In such a case, there is a possibility that the magnetic pole positions cannot be specified.

Figure 26:
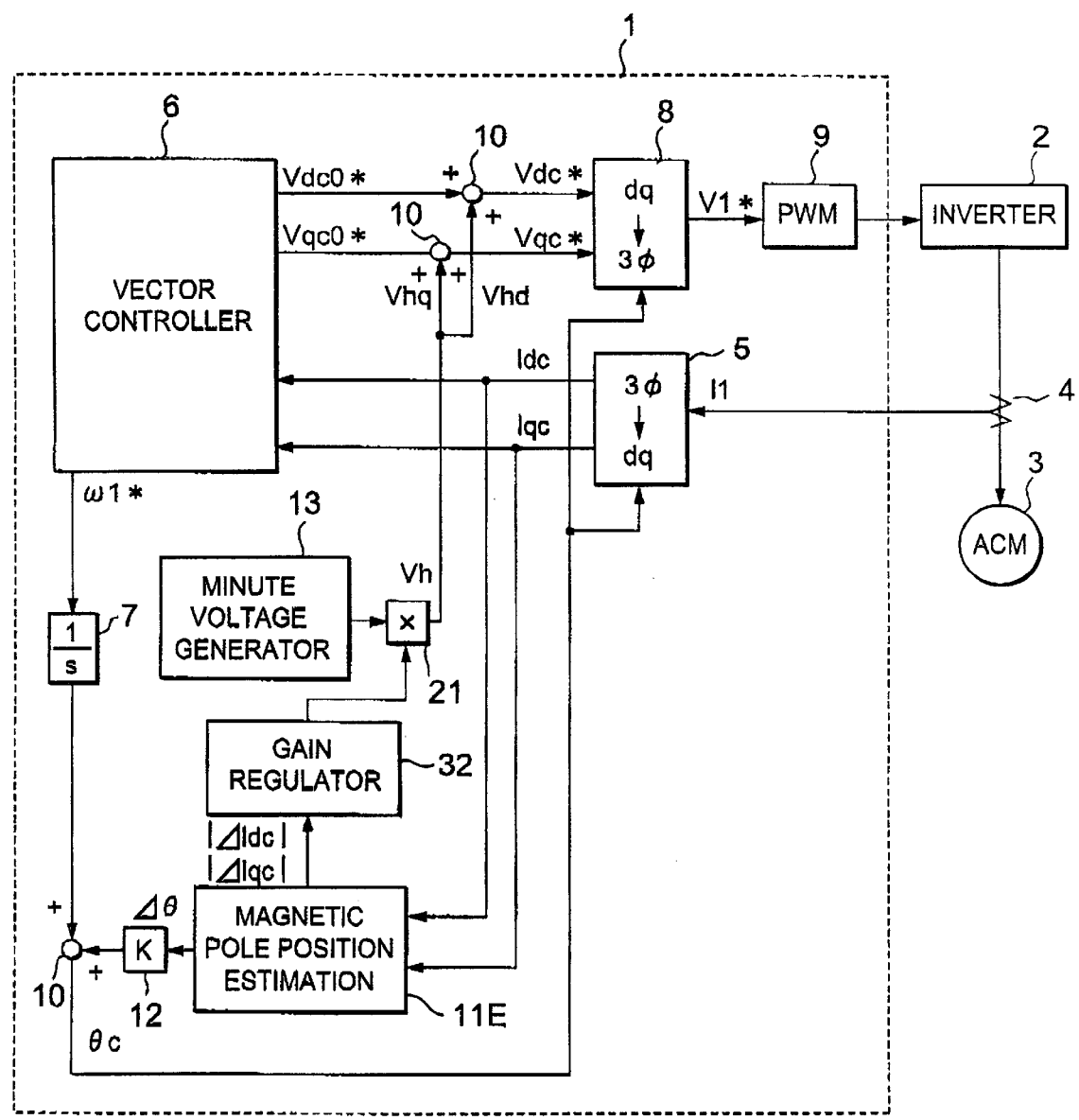
FIG. 26 is a constitutional view of a system according to a tenth embodiment of the present invention.

The tenth embodiment provides a magnetic pole position estimator which can solve such a problem. The system constitutional view of this embodiment is shown in FIG. 26. Numerals 1 to 10, 11E, 12, 13, 21 indicate elements which are identical with elements indicated by the same numerals in the preceding embodiments. A gain regulator 32 regulates the magnitude of the voltage change vh based on the current ripples ΔIdc, ΔIqc such that the current ripples ΔIdc, ΔIqc become equal to or more than given values. With the provision of the gain regulator 32, the current ripples are automatically changed and hence, the current ripples can be always observed with a good sensitivity.

As the result, whatever magnetic saturation characteristics the motor has, it becomes possible to perform the magnetic pole position estimation on the motor. Further, when the current ripple quantity is small, also by lowering the frequency but not lowering the magnitude of the voltage change vh, the same advantageous effects can be obtained.

Further, with respect to the previously-mentioned polarity discrimination method in the second, third and fourth embodiments which include such a method, the tenth embodiment is applied to obtain the sufficient current change rate such that the magnitude of the voltage change vh can be automatically adjusted using the gain regulator 32.

Subsequently, the eleventh embodiment is explained. In actually driving a motor, as explained in the respective preceding embodiments, the inverter 2 (shown in FIG. 1 or the like) is used. The inverter 2 is driven in response to a pulse outputted from the PWM generator 9. The PWM generator 9 generates the pulse by comparing a three-phase voltage command and a triangular-wave carrier. This triangular-wave carrier has a frequency thereof usually set sufficiently high compared to the driving frequency of the motor. On the other hand, it is also necessary to set the frequency of the minute voltage change vh which is used for the magnetic pole estimation sufficiently high compared to the driving frequency of the motor and hence, there may be a case that the interference between them causes a problem.

Figure 27:
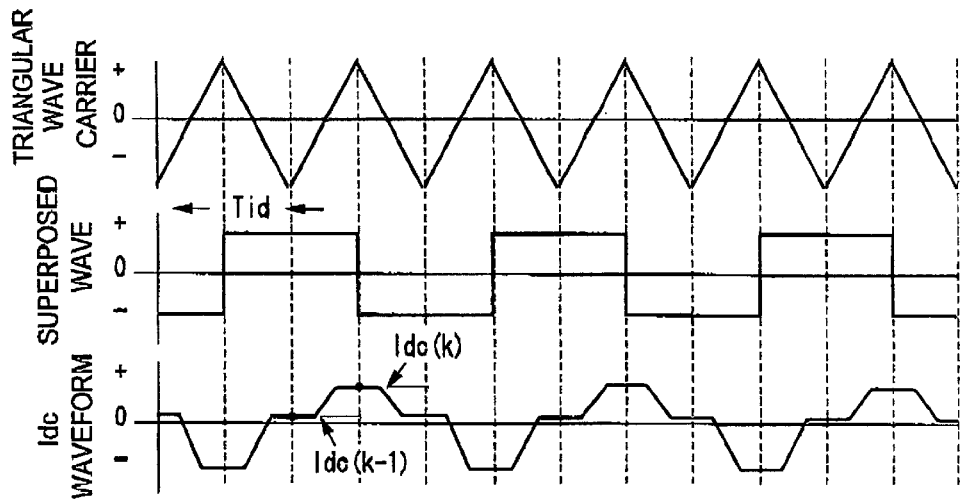
FIG. 27 is a view showing the operation of an eleventh embodiment of the present invention.

The eleventh embodiment according to the invention can solve such a problem. FIG. 27 shows the relationship between the triangular-wave carrier and the minute voltage change (superposed wave) vhd in the present invention. That is, as shown in the drawing, the interval between upper and lower peaks of the triangular-wave carrier may be set to the calculation period Tid and the minute voltage change vhd is given in synchronism with the calculation period Tid.

Further, since the actual voltage applied to the motor takes the pulse waveform, the current ripples Idc take the trapezoidal waveform as shown in FIG. 27. However, by setting the current detection timing at the upper and lower peaks of the triangular-wave carrier as shown in the drawing, it becomes possible to detect the gentlest portions of the current change rate and hence, the influences such as the ringing can be eliminated. It is needless to say that the current change rate necessary for the magnetic pole estimation can be calculated as the difference value. In this manner, according to the eleventh embodiment, the interference between the triangular-wave carrier used in the PWM and the minute voltage waveform can be obviated so that the stable magnetic pole position estimation can be realized.

Figure 28:
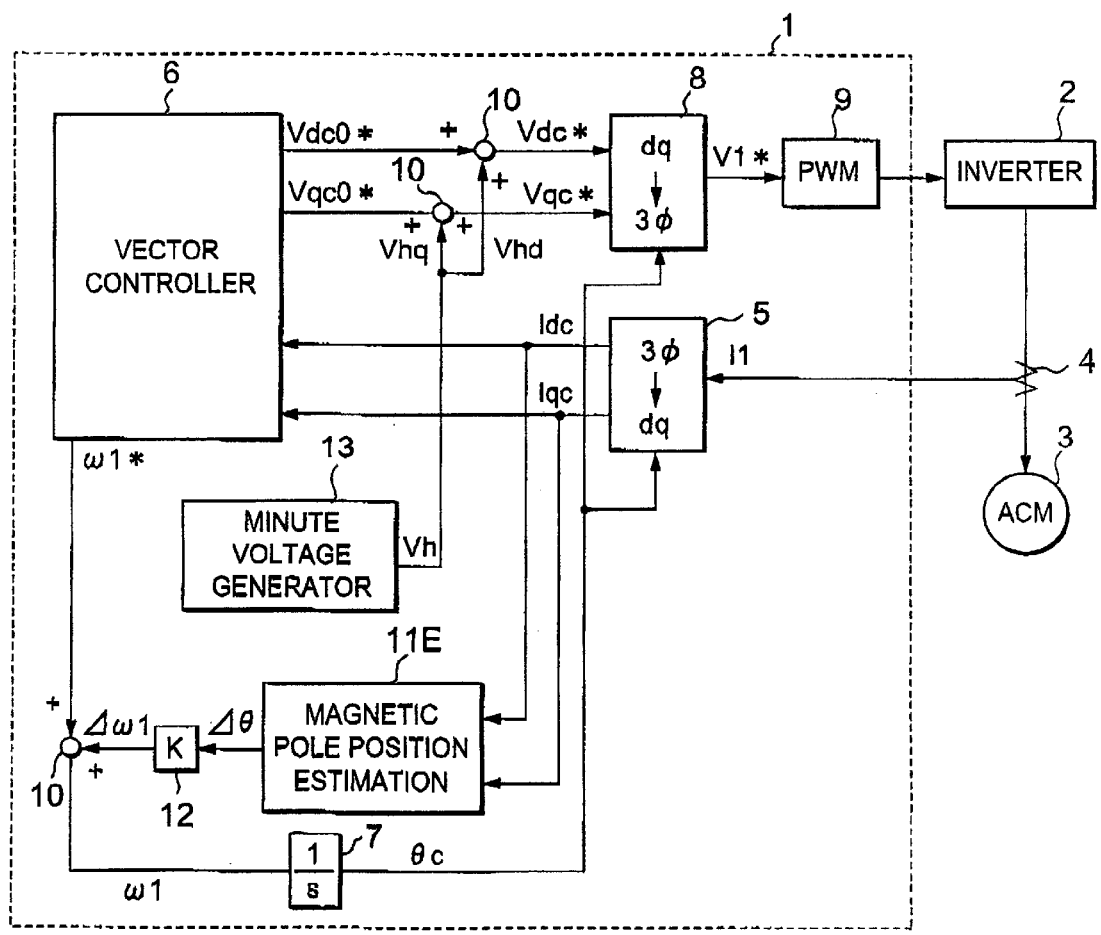
FIG. 28 is a constitutional view of a system according to a twelfth embodiment of the present invention.

Subsequently, the twelfth embodiment of the present invention is explained in conjunction with FIG. 28. Among the preceding embodiments, several embodiments are directed to the case in which the axial error $\Delta\theta$ is directly calculated. In such a case, the magnetic pole position $\theta c$ is directly corrected (FIG. 1 and FIG. 8, for example).

In the twelfth embodiment, in place of correcting the magnetic pole position $\theta c$, an electrical angle frequency correction gain $\Delta\omega 1$ is outputted from a correction unit 12 so as to correct the electrical angle frequency $\omega 1^*$. This implies that when the axial error $\Delta\theta$ is generated, the axial error $\Delta\theta$ is corrected so as to make the magnetic pole position $\theta c$ aligned with magnetic pole axis phase $\theta$. In other words, this operates like a PLL. In this case, an input to an integrator indicated by a block 7 becomes an estimation value of the motor speed. Accordingly, the speed estimation can be simultaneously realized.

What is claimed is:

1. A driving system of an AC motor including an inverter which applies an arbitrary alternating current to the AC motor and a controller which transmits control signals to the inverter, the controller including:

minute voltage applying means which applies a minute voltage change on a dc axis which constitutes an estimation axis of a magnetic flux of the motor, current observation means which observes an electric current which flows to the motor, and polarity discriminating means which discriminates the polarities of magnetic poles of the motor based on positive-side and negative-side current flow times of ripple components contained in the observed value of the electric current obtained by the current observation means.

2. A driving system of an AC motor including an inverter which applies an arbitrary alternating current to the AC motor and a controller which transmits control signals to the inverter, the controller including:

minute voltage change applying means which generates a minute voltage change on a dc axis which constitutes an estimation axis of a magnetic flux of the motor, current observation means which observes an electric current which flows to the motor, and polarity discriminating means which discriminates the polarities of magnetic poles of the motor based on the difference between positive-side and negative-side current change rates of ripple components contained in the observed value of the electric current obtained by the current observation means.

3. A driving system of an AC current motor according to claim 1, wherein the current observation means which observes the electric current which flows to the motor on a qc axis which is perpendicular to the dc axis in response to the minute voltage change given to the dc axis, said driving system further comprising magnetic pole position estimating means which estimates the magnetic pole positions in the inside of the motor using the current change rate observed on the qc axis, whereby the polarity discrimination and the estimation of the magnetic pole positions are performed in parallel.

4. A driving system of an AC current motor according to claim 2, wherein the current observation means which observes the electric current which flows to the motor on a qc axis which is perpendicular to the dc axis in response to the minute voltage change given to the dc axis, said driving system further comprising magnetic pole position estimating means which estimates the magnetic pole positions in the inside of the motor using the current change rate observed on the qc axis, whereby the polarity discrimination and the estimation of the magnetic pole positions are performed in parallel.

5. A driving system of an AC current motor according to claim 3, wherein upon completion of the polarity discrimination of the magnetic pole of the motor by the polarity discriminating means, the minute voltage applying means changes the cycle of the minute voltage change, and the magnetic pole position estimating means performs the estimation of the magnetic pole positions thereafter.

6. A driving system of an AC current motor according to claim 4, wherein upon completion of the polarity discrimination of the magnetic poles of the motor by the polarity discriminating means, the minute voltage applying means changes the cycle of the minute voltage change, and the magnetic pole position estimating means performs the estimation of the magnetic pole positions thereafter.

7. A driving system of an AC motor including an inverter which applies an arbitrary alternating current to the AC motor and a controller which transmits control signals to the inverter, the controller including:

minute voltage change applying means which gives a minute voltage change to a voltage command on a dc axis which constitutes an estimation axis of a magnetic flux of the motor and to a voltage command on a qc axis which is perpendicular to the dc axis, current observation means which observes an electric current which flows to the motor on the dc axis and the qc axis, and magnetic pole position estimating means which, with respect to ripple components contained in a current observed on the dc axis and the qc axis, estimates magnetic pole positions in the inside of the motor based on positive-side and negative-side current flow times of the ripple components.

8. A driving system of an AC motor including an inverter which applies an arbitrary alternating current to the AC motor and a controller which transmits control signals to the inverter, the controller including:

minute voltage change applying means which gives a minute voltage change to a voltage command on a dc axis which constitutes an estimation axis of a magnetic flux of the motor and a voltage command on a qc axis which is perpendicular to the dc axis, current observation means which observes an electric current which flows to the motor on the dc axis and the qc axis, and magnetic pole position estimating means which, with respect to ripple components contained in a current observed on the dc axis and the qc axis, detects current change rates of the ripple components separately at positive and negative sides of the ripple components and estimates magnetic pole positions in the inside of the motor based on the difference of the electric current rates.

9. A driving system of an AC motor according to claim 8, wherein when the AC motor is electrically salient, the minute voltage applying means alternately gives the minute voltage change to the dc axis and the qc axis.

10. A driving system of an AC motor according to claim 8, wherein magnetic pole position estimating means calculates, with respect to ΔIdcp (a current change rate at a positive side of the ripple components of a dc-axis current), ΔIdcn (a current change rate at a negative side of ripple components of the dc-axis current), ΔIqcp (a current change rate at a positive side of ripple components of a qc-axis current) and ΔIqcn (a current change rate at a negative side of ripple components the qc-axis current), an axial error Δθ(=θc−θ) between the electrical angle phase θc of the dc, qc axes and a magnetic pole axis phase θ of the motor is calculated by a following equation.

$$\Delta\theta = \tan^{-1}\frac{-(|\Delta I_{qcp}| - |\Delta I_{qcn}|)}{|\Delta I_{dcp}| - |\Delta I_{dcn}|}. \quad (10)$$

11. A driving system of an AC motor according to claim 8, wherein the magnetic pole position estimating means calculates, with respect to positive-side and negative-side individual current change rates of the ripple components on the dc, qc axes, inverse numbers of the current change rates of the respective axes and respective signs, and estimates the magnetic pole positions including the polarities in the inside of the motor based on the inverse numbers of the current change rates.

12. A driving system of an AC motor according to claim 2, wherein the driving system comprises:

comparison means which compares a current change rate of the motor which is generated along with the minute voltage change in response to the voltage command with a given value, and change regulating means which regulates the magnitude of the minute voltage change or a frequency of the motor such that the current change rate becomes equal to or more than a given value.

13. A driving system of an AC motor according to claim 8, wherein the driving system comprises:

comparison means which compares a current change rate of the motor which is generated along with the minute voltage change in response to the voltage command with a given value, and change regulating means which regulates the magnitude of the minute voltage change or a frequency of the motor such that the current change rate becomes equal to or more than a given value.

14. A driving system of an AC motor according to claim 1, wherein the driving system comprises inverter driving means which drives the inverter, the inverter drive means includes pulse width modulation control signals which use a triangular-wave carrier as control signals which are transmitted to the inverter, and the pulse width modulation control signals include step signals which change the minute voltage change in synchronism with the triangular-wave carrier.

15. A driving system of an AC motor according to claim 2, wherein the driving system comprises inverter driving means which drives the inverter, the inverter drive.means includes pulse width modulation control signals which use a triangular-wave carrier as control signals which are transmitted to the inverter, and the pulse width modulation control signals include step signals which change the minute voltage change in synchronism with the triangular-wave carrier.

16. A driving system of an AC motor according to claim 7, wherein the driving system comprises inverter driving means which drives the inverter, the inverter drive means includes pulse width modulation control signals which use a triangular-wave carrier as control signals which are transmitted to the inverter, and the pulse width modulation control signals include step signals which change the minute voltage change in synchronism with the triangular-wave carrier.

17. A driving system of an AC motor according to claim 8, wherein the driving system comprises inverter driving means which drives the inverter, the inverter drive means includes pulse width modulation control signals which use a triangular-wave carrier as control signals which are transmitted to the inverter, and the pulse width modulation control signals include step signals which change the minute voltage change in synchronism with the triangular-wave carrier.

18. A driving system of an AC motor according to claim 1, wherein a motor frequency of the controller is controlled such that an error angle between the actual magnetic pole position and the estimation magnetic flux axis of the motor is decreased.

19. A driving system of an AC motor according to claim 2, wherein a motor frequency of the controller is controlled such that an error angle between the actual magnetic pole position and the estimation magnetic flux axis of the motor is decreased.

20. A driving system of an AC motor according to claim 7, wherein a motor frequency of the controller is controlled such that an error angle between the actual magnetic pole position and the estimation magnetic flux axis of the motor is decreased.

21. A driving system of an AC motor according to claim 8, wherein a motor frequency of the controller is controlled such that an error angle between the actual magnetic pole position and the estimation magnetic flux axis of the motor is decreased.

* * * * *